(12) United States Patent
Hirayama

(10) Patent No.: US 8,352,663 B2
(45) Date of Patent: Jan. 8, 2013

(54) DATA STORAGE APPARATUS AND METHOD OF DATA TRANSFER

(75) Inventor: Hiroshi Hirayama, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 250 days.

(21) Appl. No.: 12/206,908

(22) Filed: Sep. 9, 2008

(65) Prior Publication Data

US 2010/0023655 A1 Jan. 28, 2010

(30) Foreign Application Priority Data

Jul. 25, 2008 (JP) .................................. 2008-191623

(51) Int. Cl.
*G06F 13/14* (2006.01)

(52) U.S. Cl. ........ 710/305; 710/306; 710/310; 710/311; 710/312; 710/313; 710/314; 710/315; 710/316; 710/317

(58) Field of Classification Search .................. None
See application file for complete search history.

(56) References Cited

U.S. PATENT DOCUMENTS

| | | | | |
|---|---|---|---|---|
| 5,165,023 | A * | 11/1992 | Gifford | 710/317 |
| 6,233,643 | B1 * | 5/2001 | Andrews et al. | 710/316 |
| 6,385,624 | B1 | 5/2002 | Shinkai | |
| 6,496,516 | B1 * | 12/2002 | Dabecki et al. | 370/460 |
| 6,560,667 | B1 * | 5/2003 | Wolrich et al. | 710/310 |
| 6,614,796 | B1 * | 9/2003 | Black et al. | 370/403 |
| 6,839,892 | B2 * | 1/2005 | Dawkins et al. | 717/124 |
| 7,474,612 | B1 * | 1/2009 | Patel | 370/217 |
| 8,095,733 | B2 * | 1/2012 | Arimilli et al. | 711/119 |
| 8,127,300 | B2 * | 2/2012 | Arimilli et al. | 718/105 |
| 2001/0013076 | A1 * | 8/2001 | Yamamoto | 710/33 |
| 2002/0073223 | A1 * | 6/2002 | Darnell et al. | 709/232 |
| 2002/0073251 | A1 | 6/2002 | Yamamoto et al. | |
| 2002/0087751 | A1 * | 7/2002 | Chong, Jr. | 710/33 |
| 2002/0103948 | A1 * | 8/2002 | Owen et al. | 710/33 |
| 2003/0005103 | A1 * | 1/2003 | Narad et al. | 709/223 |

(Continued)

FOREIGN PATENT DOCUMENTS

JP H10-271463 A 10/1998

(Continued)

OTHER PUBLICATIONS

English Translation of the Office Action for the counterpart JP application No. JP2008-191623, mailed on May 22, 2012.

*Primary Examiner* — Henry Tsai
*Assistant Examiner* — Christopher Bartels
(74) *Attorney, Agent, or Firm* — Hitachi America, Ltd.

(57) ABSTRACT

A data storage apparatus having improved data transfer performance. The storage apparatus has: plural controllers connected to each other by first data transfer paths; plural processors controlling the controllers; and second data transfer paths through which the controllers send data to various devices. Each of the controllers has a data-processing portion for transferring data to the first and second data transfer paths. The data-processing portion has a header detection portion for detecting first header information constituting data, a selection portion for selecting data sets having continuous addresses of transfer destination and using the same data transfer path from plural data sets such that a coupled data set is created from the selected data sets, a header creation portion for creating second header information about the coupled data set, and coupled data creation means for creating the coupled data set from the selected data sets and from the second header information.

16 Claims, 18 Drawing Sheets

U.S. PATENT DOCUMENTS

| | | | |
|---|---|---|---|
| 2003/0055864 A1* | 3/2003 | Armstrong et al. | 709/107 |
| 2003/0123390 A1* | 7/2003 | Takase et al. | 370/230.1 |
| 2004/0139246 A1* | 7/2004 | Arimilli et al. | 710/36 |
| 2004/0199704 A1* | 10/2004 | Phelps et al. | 710/306 |
| 2005/0005063 A1* | 1/2005 | Liu et al. | 711/112 |
| 2005/0021907 A1 | 1/2005 | Shimada | |
| 2005/0044289 A1* | 2/2005 | Hendel et al. | 710/33 |
| 2005/0071514 A1* | 3/2005 | Anderson et al. | 710/1 |
| 2005/0114555 A1* | 5/2005 | Errickson et al. | 710/3 |
| 2005/0246453 A1* | 11/2005 | Erlingsson et al. | 710/1 |
| 2005/0265150 A1* | 12/2005 | Hirayama et al. | 369/44.37 |
| 2006/0013128 A1* | 1/2006 | Connor et al. | 370/229 |
| 2006/0013494 A1* | 1/2006 | Isu et al. | 382/232 |
| 2006/0080579 A1 | 4/2006 | Rothman et al. | 714/43 |
| 2006/0195663 A1* | 8/2006 | Arndt et al. | 711/153 |
| 2006/0209863 A1* | 9/2006 | Arndt et al. | 370/412 |
| 2006/0233172 A1* | 10/2006 | Venkata et al. | 370/391 |
| 2006/0236067 A1* | 10/2006 | Attinella et al. | 711/173 |
| 2006/0239260 A1* | 10/2006 | Chen | 370/389 |
| 2006/0242379 A1 | 10/2006 | Korgaonkar et al. | |
| 2007/0011402 A1 | 1/2007 | Sato et al. | |
| 2007/0266179 A1* | 11/2007 | Chavan et al. | 709/250 |
| 2008/0043742 A1* | 2/2008 | Pong et al. | 370/394 |
| 2008/0043750 A1* | 2/2008 | Keels et al. | 370/395.52 |
| 2008/0201498 A1* | 8/2008 | Ohkubo | 710/33 |
| 2008/0201501 A1* | 8/2008 | Partani et al. | 710/60 |

FOREIGN PATENT DOCUMENTS

| | | |
|---|---|---|
| JP | H10-333836 A | 12/1998 |
| JP | 2001-119412 | 4/2001 |
| JP | 2002-222162 A | 8/2002 |
| JP | 2004-070973 A | 3/2004 |
| JP | 2005-044010 | 2/2005 |
| JP | 2006-302274 A | 11/2006 |
| JP | 2007-018312 | 1/2007 |
| JP | 2007-304883 A | 11/2007 |

* cited by examiner

FIG. 3
(a) WRITE COMMAND (MWr64)
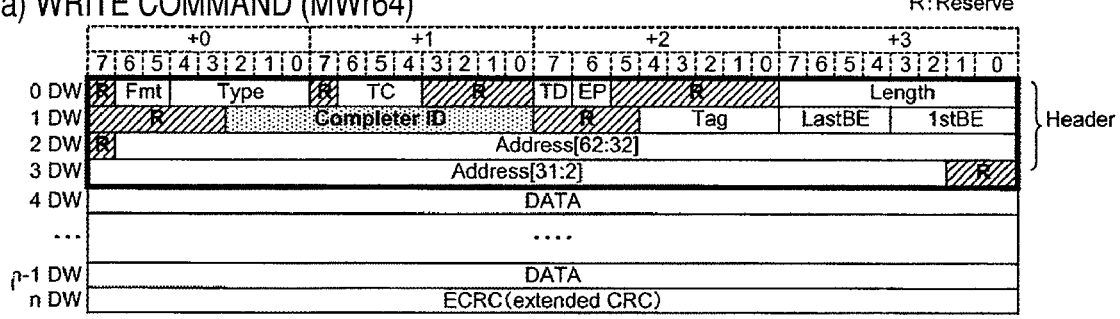
(b) WRITE RESPONSE (MWr64)
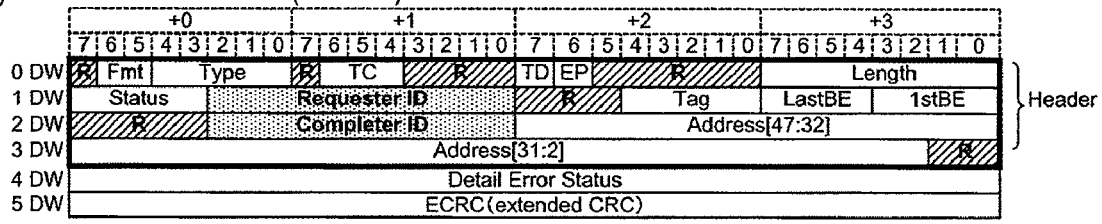
(c) READ COMMAND (MRd64)
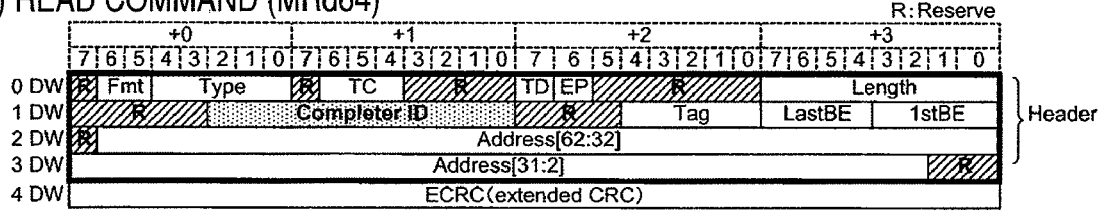
(d) READ RESPONSE (CpID)
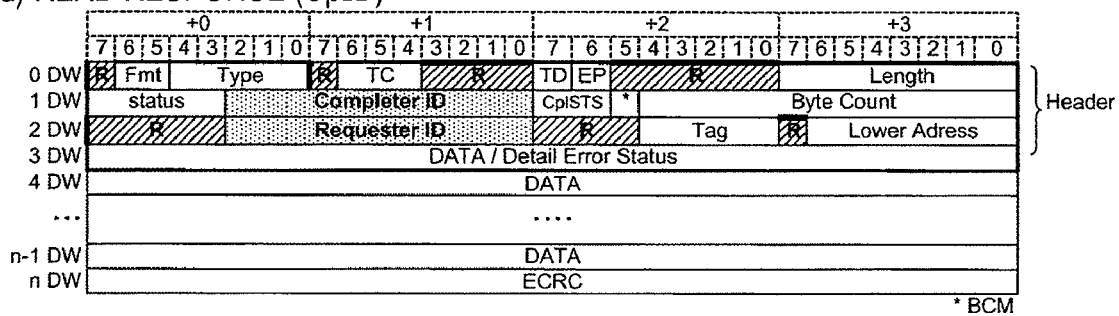
*BCM
(e) EXPLANATION OF EACH CONSTITUENT BIT (EXCERPTS)
| Completer ID | LSI # | CONTROLLER ID NO. (0: CTL0; 1: CTL1; 2: CTL2; 3: CTL3) | |
|---|---|---|---|
| Requester ID | Func. # | ID OF SENDER | ID OF DESTINATION |
| | | 0x00 : BRGMP | 0x10 : BRGMP |
| | | 0x01 : BRG DUAL | 0x11 : BRG DUAL |
| | | 0x02 : BRG CROSS | 0x12 : BRG CROSS |
| | | 0x03 : HDMA(BRGH) | 0x13 : HDMA(BRGH) |
| | | 0x04 : DDMA(BRGD) | 0x14 : DDMA(BRGD) |
| | | 0x05 : MEMCTL | 0x15 : MEMCTL |

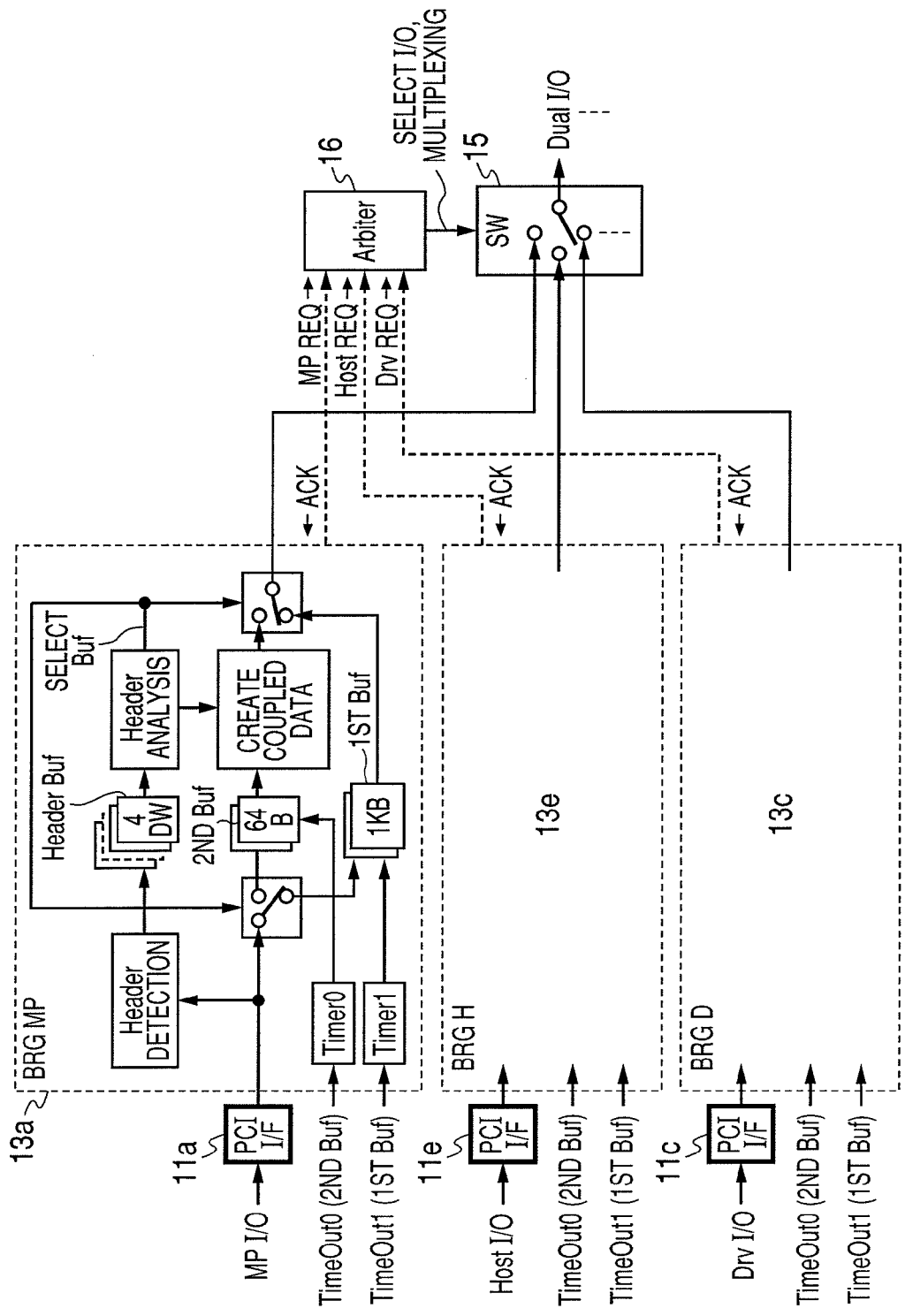

FIG. 16

(a) WRITE COMMAND (MWr64)

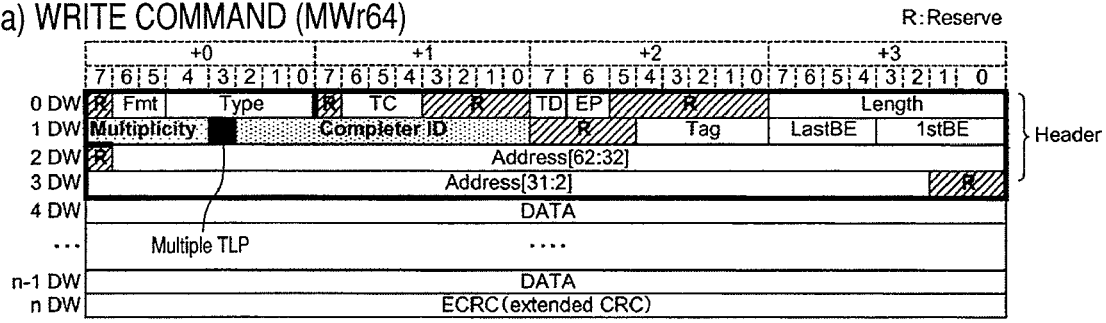

(b) WRITE RESPONSE (MWr64)

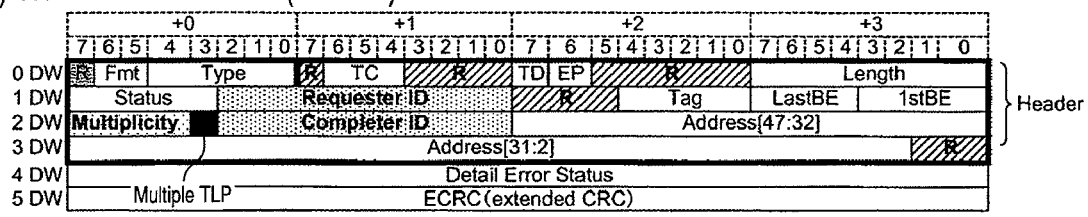

(c) READ COMMAND (MRd64)

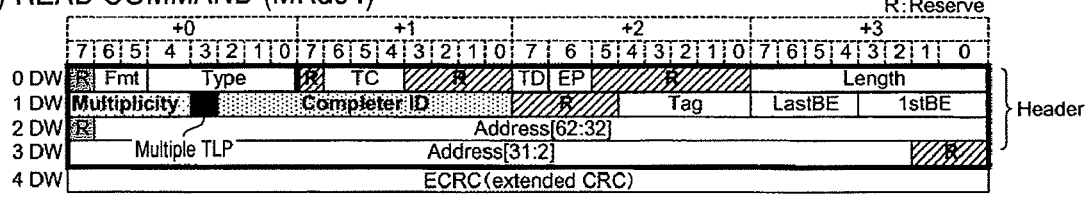

(d) READ RESPONSE (CpID)

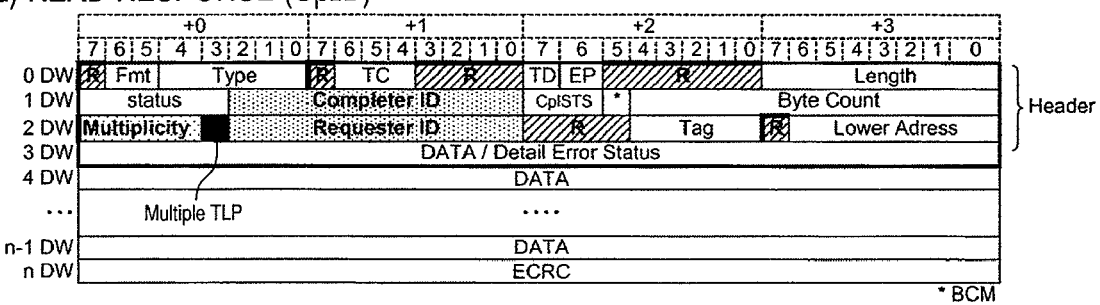

(e) EXPLANATION OF VARIOUS CONSTITUENT BITS (EXCERPTS)

| Completer ID | LSI # | CONTROLLER ID NO. (0: CTL0; 1: CTL1; 2: CTL2; 3: CTL3) | |
|---|---|---|---|
| Requester ID | Func. # | SENDER ID | DESTINATION ID |
| | | 0x00 : BRGMP | 0x10 : BRGMP |
| | | 0x01 : BRG DUAL | 0x11 : BRG DUAL |
| | | 0x02 : BRG CROSS | 0x12 : BRG CROSS |
| | | 0x03 : HDMA(BRGH) | 0x13 : HDMA(BRGH) |
| | | 0x04 : DDMA(BRGD) | 0x14 : DDMA(BRGD) |
| | | 0x05 : MEMCTL | 0x15 : MEMCTL |
| | | 0x06 : MPX | |
| Multiple TLP | Flag | 1: MULTIPLEXED TLPs; 0: NORMAL TLP | |
| Multiplicity | MULTIPLICITY NUMBER | NUMBER OF MULTIPLEXED TLPs | |

TRANSFER INVOLVING DATA IF WRITE RESPONSE
AND READ COMMANDS ARE MULTIPLEXED
(TRANSFERRED AS CpID AND MWr64 COMMAND)

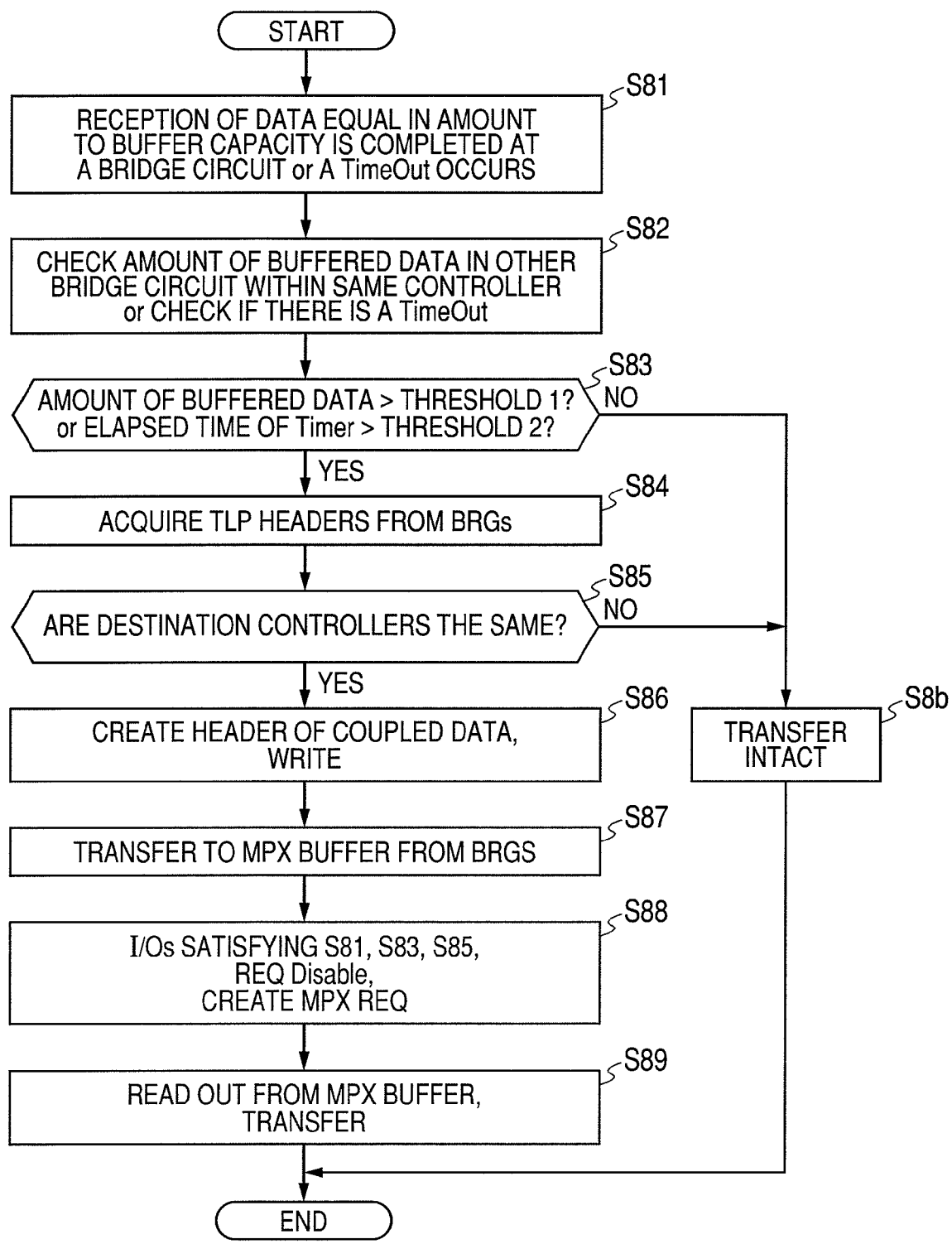

DATA STORAGE APPARATUS AND METHOD OF DATA TRANSFER

CROSS-REFERENCES TO RELATED APPLICATIONS

This application relates to and claims priority from Japanese Patent Application No. 2008-191623, filed on Jul. 25, 2008, now JP. Patent Application Publication No. 2010-033125, the entire disclosure of which is incorporated herein by reference.

BACKGROUND OF THE INVENTION

1. Field of the Invention

The present invention relates to a data storage apparatus and a method of data transfer and, particularly, to a data storage apparatus in which data transfer paths are connected from each controller to a cache memory, a host, a hard disk drive (HDD), and other components. The invention also relates to a method of data transfer adapted for use in this data storage apparatus.

2. Description of the Related Art

In the past, a data storage apparatus has been composed of plural modules connected to each other by dedicated data transfer paths, each module being made of a drive interface, a controller for controlling transfer of data, data transfer paths interconnecting the interface and controller, and a microprocessor for controlling the whole system, a host interface, a cache memory, and other components. Electric power is supplied to the modules from power supplies independently. Each module writes data transferred from a host into cache memories of the modules. Because of this countermeasure, loss of transferred data is avoided, and the reliability of the system is enhanced (patent reference 1).

To transfer data along dedicated data transfer paths interconnecting the modules, data transferred to the cache memories of other modules, data transferred among the host interface, drive interface, and cache memories, and control data shared between processors are time shared, multiplexed, and transferred. In some cases, transferred data may be different greatly in transfer length according to transfer sources and transfer destinations. For example, when a microprocessor transfers control data to a host interface or a drive interface, control data sets shorter in transfer length than other data sets are frequently transferred. Control data sets having short transfer lengths are time shared and multiplexed on dedicated data transfer paths with data sets having large transfer lengths. Overhead produced when data is multiplexed delays data transfer between source and receiver. There is a tendency that the transfer time is increased. Furthermore, there is the tendency that data transfer times vary more widely for the same reason.

One example of method of suppressing the transfer time and differences in the transfer time is disclosed in patent reference 2. In particular, data transferred in various transfer channels are converted into cells (packets) in the common format. Cells to be transferred to the same destination are time shared and multiplexed. The method permits differences in delay time between transfers of data along the various transfer channels to be suppressed.

[Patent reference 1] JP-A-2005-44010
[Patent reference 2] JP-A-2001-119412

SUMMARY OF THE INVENTION

A data storage apparatus is composed of plural modules connected via dedicated data transfer paths, each module being constituted by a drive interface, a controller for controlling transfer of data, data transfer paths interconnecting the interface and controller, and a microprocessor for controlling the whole system. A host interface, a cache memory, and a HDD are connected with the drive interface. In the data storage apparatus, when data is transferred between the modules using the dedicated data transfer paths, control data produced by the microprocessor is transferred, as well as normal data. Therefore, there is the tendency that the multiplicity of transferred data is increased.

As the multiplicity increases, the time of overhead per unit time produced between one transfer of data and subsequent transfer of data increases. This makes it impossible to fully utilize the transfer band possessed by the dedicated data transfer paths. There is the possibility that the actual transfer rate in the dedicated data transfer paths decreases. As a result, there is the problem that the performance of the whole data storage apparatus deteriorates.

Control data issued by the microprocessor are values set for control registers equipped in controller, host interface, and drive interface. Accordingly, the control data is shorter in transfer length than normal data. Meanwhile, the controller for transferring the control data does not transfer data until the capacity of the buffer equipped in the controller is exceeded. Accordingly, transfer times of control data sets become more widely different. There is the problem that the control response to the controller, host interface, and drive interface controlled by control instructions issued from the microprocessor deteriorates.

Even where the buffer capacity is not exceeded, data stored in the reception buffer may be forcibly read out after a lapse of a given time period and transferred. This processing is referred to as timeout processing. Even where data stored in the reception buffer does not reach the buffer capacity but is transferred, an amount of data equal to or less than the buffer capacity is transferred at a time. Therefore, transferred data accompanies, for example, both data stored in the reception buffer and dummy data (invalid data) corresponding to the difference in amount between each amount of data stored and the buffer capacity. If control data accompanying dummy data is transferred along a dedicated data transfer path, the ratio of the amount of effective data to the amount of data transferred per unit time decreases, greatly reducing the actual transfer rate. That is, the transfer band possessed by the dedicated data transfer path is wasted by transfer of dummy data. Hence, there is the problem that the control response to the host interface and drive interface controlled by control data issued by the microprocessor deteriorates severely.

Furthermore, data transferred with dummy data as described above is multiplexed with data transferred among the host, driver interface, and cache memory on the dedicated data transfer paths. Accordingly, where the total transfer rate necessary for the multiplexed transferred data exceeds the maximum transfer rate possessed by the dedicated data transfer rates, the actual transfer rates of the transferred data sets deteriorate. There is the problem that the data processing performance of the data storage apparatus deteriorates greatly.

On the other hand, when the performance of the data storage apparatus is enhanced, the number of modules is increased. Also, the number of the host interfaces and drive interfaces are increased. Thus, a multi-controller architecture is constituted. However, even in this architecture, transfer of data using dedicated data transfer paths interconnecting modules suffer from problems similar to the foregoing problems.

Where the method disclosed in the above-cited patent reference 2 is applied to data storage apparatus of the aforementioned modular architecture, the following problem takes place.

In the method disclosed in patent reference 2, when data is transferred using dedicated data transfer paths between modules, data sets are combined into cells (packets) in a common form for each transfer channel and transferred. However, when data sets are combined into cells in the common form, the transfer lengths of transferred data are not taken into consideration. Therefore, it is necessary to store an amount of data necessary to create common cells. Data sets having small transfer lengths are transferred with great delay.

The technique of patent reference 2 is intended to improve the multiplicity of transferred data at a high-speed switch. Common cells are multiplexed in the front stage and multiplexed with other multiplexed data in the post-stage. Overhead produced when multiplexing is done cannot be suppressed by improvement of the multiplicity in the post-stage.

When data is transferred within a data storage apparatus, the data transferred have variable transfer lengths. The frequency of occurrence of transfer is different between individual data transfer paths. It is desired to perform efficient data transfer by suppressing the multiplicity on dedicated data transfer paths (i.e., suppressing the overhead), while taking account of the transfer lengths of transferred data sets and the frequency of transfers. Furthermore, it is desired that differences in transfer time between transfer data sets and their delays be suppressed and that the response of the data storage apparatus be improved.

Where the number of modules is increased to enlarge the scale of the data storage apparatus, it is also desired that transfer of data using dedicated data transfer paths between modules be done efficiently and that the response of the data storage apparatus be improved.

A data storage apparatus that achieves the above-described object in accordance with the teachings of the present invention has: plural controllers connected with a host device and a storage device via interfaces, the controllers being connected with each other by first data transfer paths; plural processors for controlling the controllers, respectively; and second data transfer paths via which the controllers transfer data to and from the host device, the storage device, and the processors. Each of the controllers has a data-processing portion for transferring data to the first and second data transfer paths. The data-processing portion has a header detection portion for detecting first header information constituting data, a selection portion for selecting from plural data sets those data sets from which a coupled data set is to be created, a header creation portion for creating second header information about the coupled data set, and coupled data creation means for creating the coupled data set from the selected data sets and from the second header information. The selection portion selects data sets having continuous transfer destination addresses and using the same data transfer path out of the plural data sets.

Where the data storage apparatus of the present invention is used, the data-transfer performance can be improved.

BRIEF DESCRIPTION OF THE DRAWINGS

FIG. 3 is a diagram illustrating a packet format used to transfer data inside and between controllers;

FIG. 3(a) is a diagram illustrating a write command used when data is transferred from a source to a destination;

FIG. 3(b) is a diagram illustrating a response packet (write response) for transferring a status (non-posted) in response to a write command;

FIG. 3(c) is a diagram illustrating a read command composed only of a header;

FIG. 3(d) is a diagram illustrating a response packet for a read response consists of a header, data transferred from a source (completer), and an error status;

FIG. 3(e) is a diagram illustrating the portions of the headers of the commands which have been optimized for transfer of data within each controller;

FIG. 8 is a diagram illustrating a bridge circuit configuration according to a second embodiment of the invention and constituent elements associated with data transfer to and from data transfer paths;

FIG. 16 is a diagram illustrating a packet format used for data transfer inside and between controllers of the second data storage apparatus;

FIG. 16(a) is a diagram illustrating a write command used when data is transferred from a source to a destination;

FIG. 16(b) is a diagram illustrating a response packet (write response) for transferring a status (non-posted) in response to a write command;

FIG. 16(c) is a diagram illustrating a read command composed only of a header;

FIG. 16(d) is a diagram illustrating a response packet for a read response consists of a header, data transferred from a source (completer), and an error status;

FIG. 16(e) is a diagram illustrating the portions of the headers of the commands which have been optimized for transfer of data within each controller;

FIG. 18 is a flowchart illustrating a method of data transfer in the second data storage apparatus.

DETAILED DESCRIPTION OF THE INVENTION

Embodiments of the present invention are hereinafter described with reference to the accompanying drawings. It is to be noted that the embodiments described below do not restrict the scope of the present invention and that all of various components described in the embodiments and their combinations are not always essential for the solving means of the invention.

(1) Embodiment 1

Figure 1:
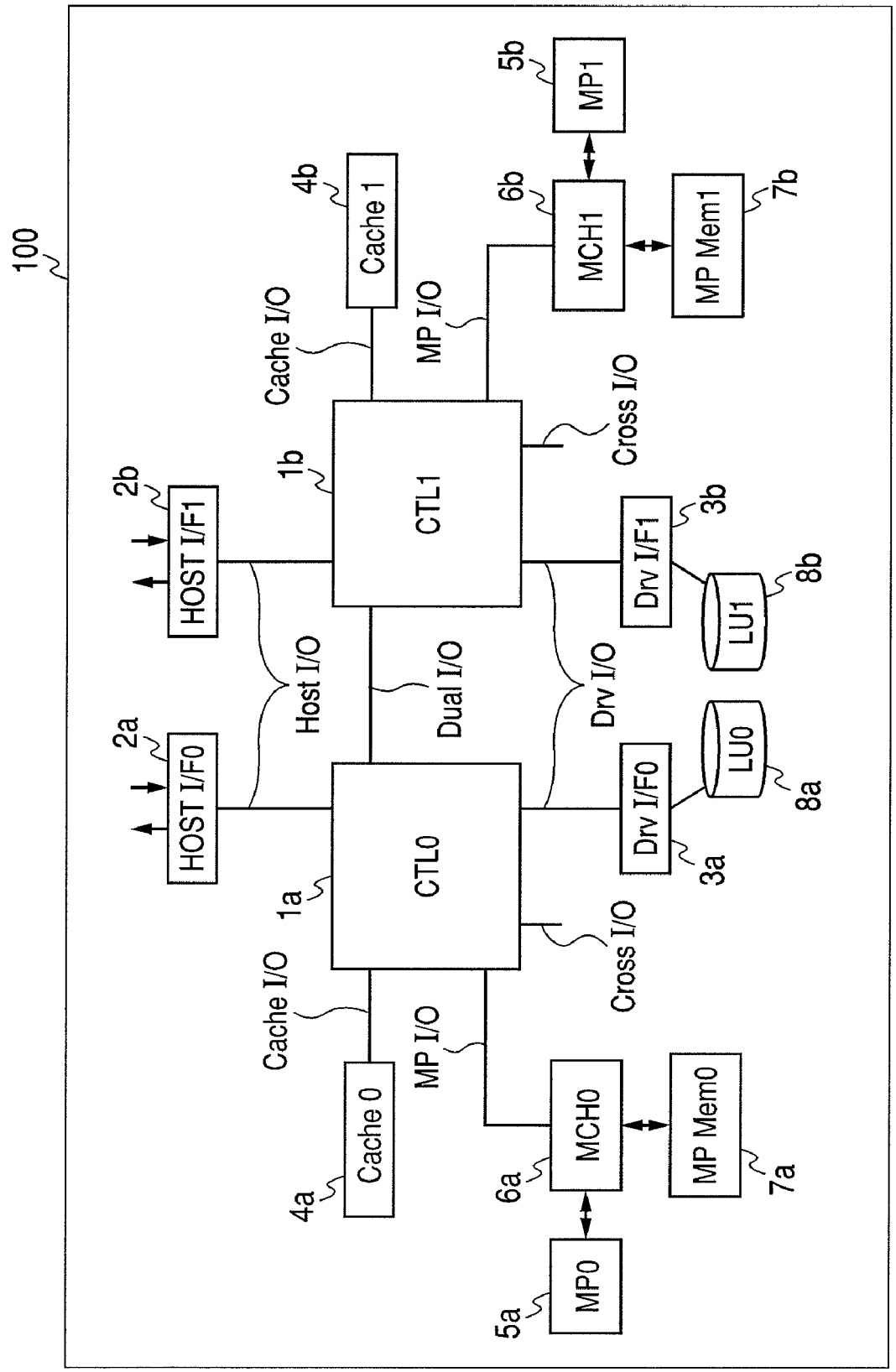
FIG. 1 is a block diagram of a data storage apparatus to which the present invention is applied.

FIG. 1 is a block diagram of a data storage apparatus according to Embodiment 1 of the present invention. The storage apparatus, generally indicated by reference numeral 100, is composed of the following components.

Figure 14:
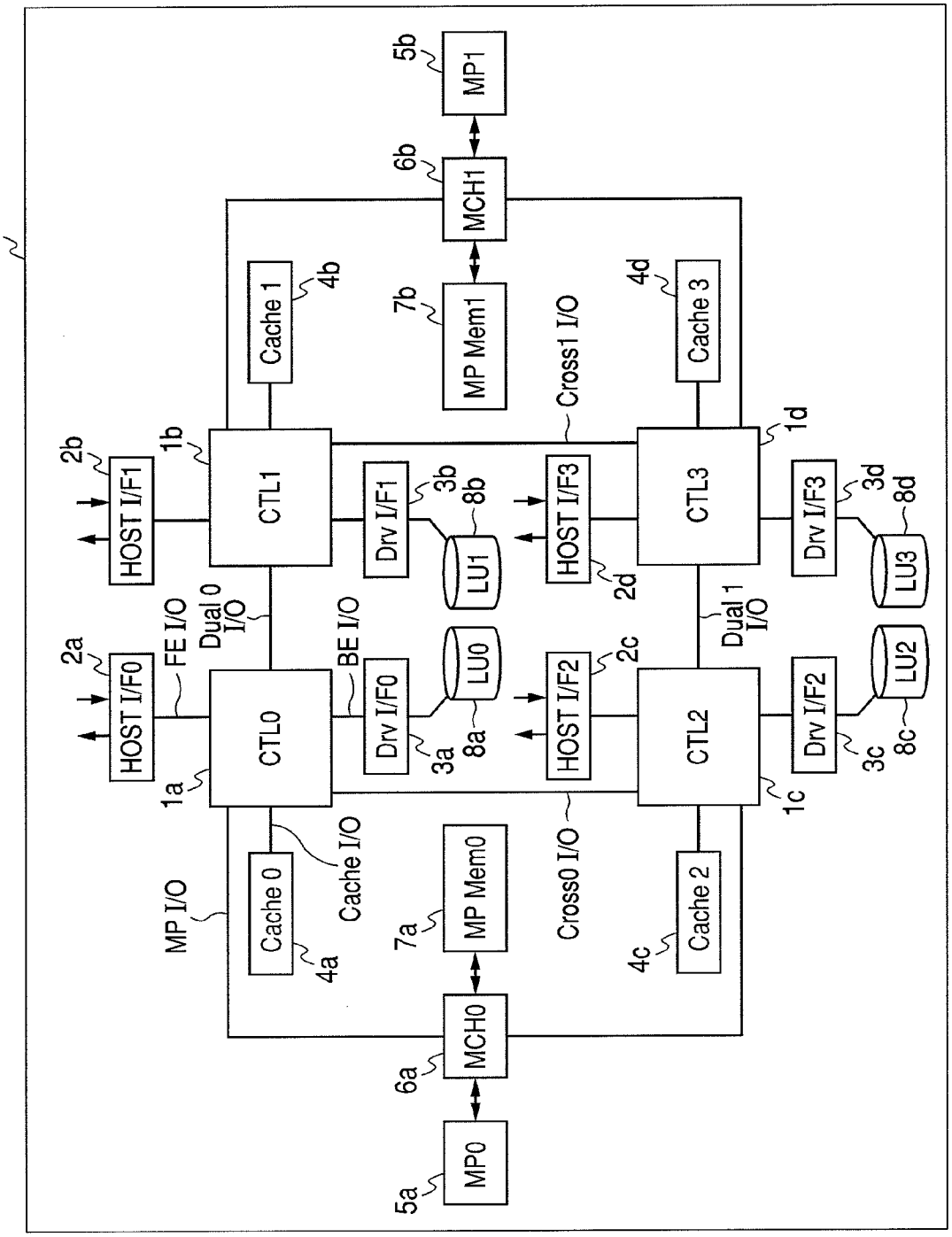
FIG. 14 is a block diagram of a second data storage apparatus to which the present invention is applied.

The apparatus includes controllers 1a (CTL0) and 1b (CTL1) that control data transfer performed via data transfer paths between host interfaces 2a and 2b (Host I/F0 and Host I/F1), drive interfaces 3a and 3b (Drv I/F0 and Drv I/F1), cache memories 4a and 4b (Cache0 and Cache1), and microprocessors 5a and 5b (MP0 and MP1). The controllers 1a and 1b are connected by a dual data transfer path (Dual I/O). That is, the apparatus has a dual controller architecture. In addition, in order to expand the scale of the storage apparatus, it includes cross data transfer paths (Cross I/O) that are interfaces for connection with other modules. The cross data transfer paths will be described in detail in a fourth embodiment (FIG. 14).

The host interfaces 2a and 2b are interfaces for controlling transfer of each individual packet according to communication protocols with the host.

The drive interfaces 3a and 3b are interfaces for controlling data transfer of each sector in accordance with the communication protocols with a hard disk drive.

The cache memories 4a and 4b are memories for temporarily storing data transferred from the host interfaces 2a and 2b and from the drive interfaces 3a and 3b. A high-speed memory typified by a DDR (double data rate synchronous DRAM) is used as each cache memory. Loss of transferred data from the host can be prevented by providing the cache memories 4a and 4b. Furthermore, the performance of read response to the host can be improved by cache hits.

The microprocessor 5a controls the controller 1a, host interface 2a, and drive interface 3a. Similarly, the microprocessor 5b controls the controller 1b, host interface 2b, and drive interface 3b. The microprocessor 5a is connected with the controller 1a and a processor memory (MP Mem0) 7a via a memory controller hub (MCH) 6a. Similarly, the microprocessor 5b is connected with the controller 1b and a processor memory (MP Mem1) 7b via a memory controller hub (MCH) 6b. The memory controller hubs 6a and 6b are connected with the controllers 1a and 1b, respectively. The memory controller hubs 6a, 6b and processor memories 7a, 7b are connected with the controllers 1a and 1b, respectively, via their respective MP I/O.

Hard disk drives are connected with the drive interfaces 3a and 3b. The hard disk drives constitute logical volumes (LU0 and LU1) 8a and 8b, respectively, which are managed by the microprocessors (MP0 and MP1) 5a and 5b, respectively. The logical volumes are spaces accessed by the host side.

Figure 2:
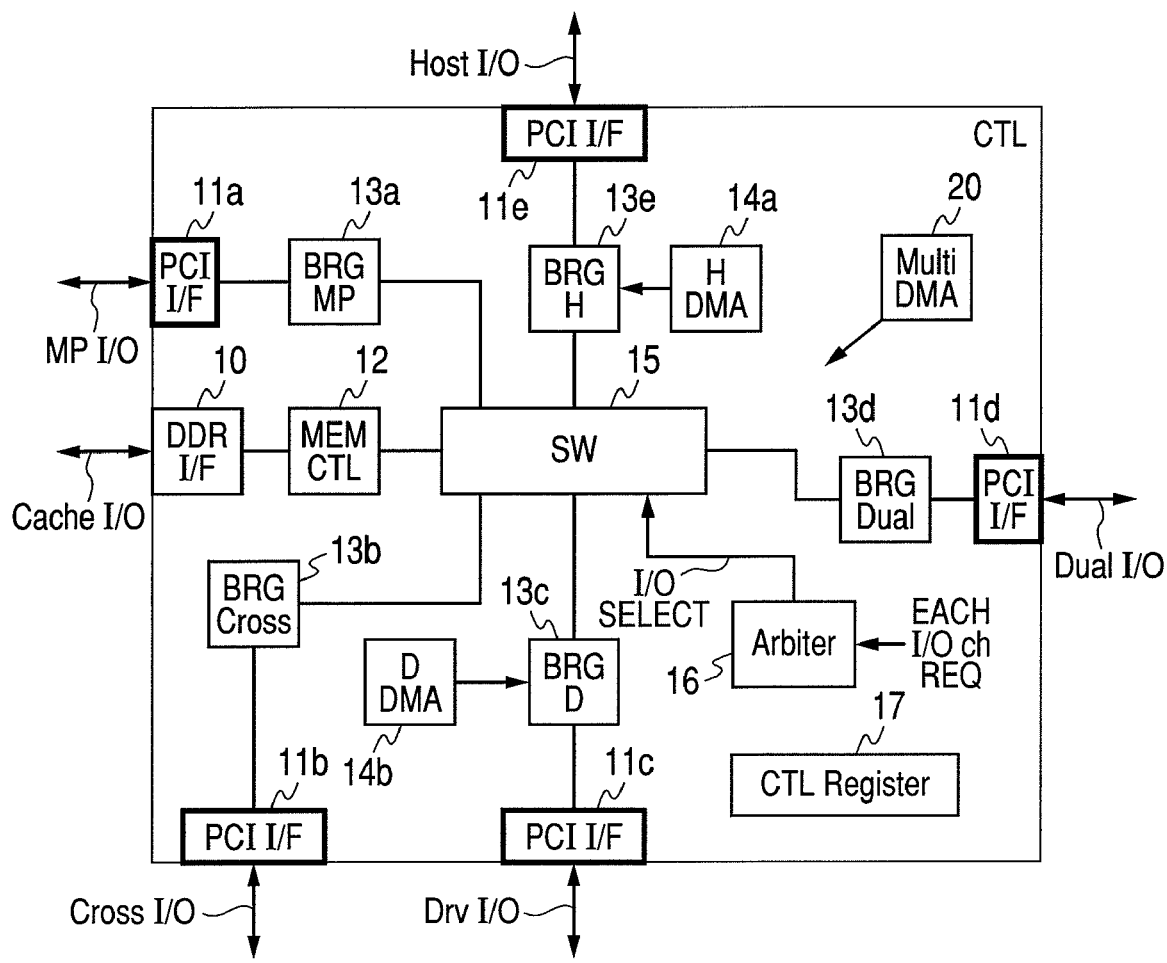
FIG. 2 is an internal block diagram of a controller constituting the data storage apparatus.

FIG. 2 is an internal block diagram of the controllers 1a and 1b. Data is transferred on the data transfer paths (including MP data transfer paths, cross data transfer paths, host data transfer paths (Host I/O), drive data transfer paths (Drv I/O), and dual data transfer path) connected with the controllers 1a and 1b, for example, via PCI-express links complying with high-speed serial bus standards.

A DDR I/F 10 controls data transfer between the cache memory 4a or 4b and each controller 1a or 1b. The DDR I/F 10 and cache memories 4a and 4b are connected by cache data transfer paths.

PCI I/Fs (11a-11e) control data transfer according to communication protocols in various layers including physical layers, link layers, and transaction layers. For example, data transfer in transaction layers is effected in packets in a TLP (transaction layer packet) format.

A memory controller (MEM CTL) 12 controls issuance of commands for reading and writing to and from the cache memories, RMW (read modify write), and refreshing of DRAMs. The memory controller 12 is connected with a high-speed switch (SW) 15 within each controller 1a or 1b.

Bridge circuits 13a-13e (BRG MP, BRG Cross, BRG D, BRG Dual, and BRG H) are connected with the high-speed switch 15 within each controller 1a or 1b. Each of these bridge circuits is a bridge circuit including a header reception buffer and a header transmission buffer for transferred data. Because the bridge circuits 13a-13e have buffers, they can hold and rewrite header information constituting transferred data. The bridge circuits have packet-converting functions adapted for transfer of data within and between the controllers 1a and 1b.

DMA circuits 14a and 14b (H DMA and D DMA) are connected with the bridge circuit 13e (BRG H) and bridge circuit 13c (BRG D), respectively, and act as transfer sources (or, requesters) which control transfer operations performed via the data transfer paths.

At the high-speed switch (SW) 15, if plural requests for data transfer are issued from plural requesters to the same transfer destination, data transferred from the transfer sources is time shared, multiplexed, and transferred under control of an arbiter 16. The arbiter 16 makes a selection from data transfer requests produced simultaneously according to determined priority orders.

A control register (CTL Register) 17 is a control register for controlling operations performed inside the controller and acquiring information about the status of internal operations. The register length is a minimum data length of 1 DW (Double Word) consisting of 4 bytes. The microprocessors 5a and 5b make access to the control register via MP data transfer paths and control the controllers by transferring control data and acquiring the status of operation.

A DMA circuit (Multi DMA) 20 controls transfer of data made via data transfer paths to and from the microprocessor 5a and 5b and cache memories 4a and 4b.

The TLP configuration is next described.

FIG. 3 shows a TLP format used when data is transferred within each controller constituting the storage apparatus 100 of FIG. 1 or when data is transferred between the controllers 1a and 1b.

Data in TLP format is composed of a TLP header and a data portion.

In FIG. 3, (a) shows a write command used when data is transferred from a source to a destination. The command consists of a header and transferred data.

In FIG. 3, (b) shows an response packet (write response) for transferring a status (non-posted) in response to a write command. The packet includes an error status in response to the write command.

In FIG. 3, (c) shows a read command composed only of a header. (d) shows a read response (completion) in response to a read command. The read response consists of a header, data transferred from a source (completer), and an error status.

The data lengths of the commands shown in (a) and (d) of FIG. 3 are determined by the transfer length within the header. For example, when a microprocessor makes an access to a controller register, a cache memory, a control register within a host interface, and a control register within a drive interface, the minimum data length is 1 DW (Double Word), 4 bytes. The transfer length is 8 bit length and corresponds to transfer of data of 256 DW, 1,024 bytes at maximum.

In FIG. 3, (e) shows the portions of the headers of the each commands which have been optimized for transfer of data within each controller and between the controllers 1a and 1b. The TLP header has a completer ID indicating the destination of the data and a requester ID indicating the source of the data. Each of the completer ID and requester ID has an LSI number (LSI #) for identifying a controller having the completer or requester, and a function number (Func. #) for identifying a data transfer path to the transfer source or destination. The completer ID and requester ID are given by the microprocessor 5a or 5b and the controller 1a or 1b itself in each bridge circuit and control transfer of TLPs.

When there is a read instruction, for example, a Tag number hands over a tag number contained in the TLP to every read renponce, and is used for identification of an renponce packet in response to a requester's request.

The other bits constituting the header comply with the TLP format regulated in the PCI Express and so their description is omitted. The TLP header described so far is not used for TLP transfers between data transfer paths (Host I/O, Drv I/O, and MP I/O) connected with the controllers. A format completely complying with the TLP format in the PCI Express is utilized for those transfer paths. The header maintains the TLP compatibility by performing a replacement within each bridge circuit inside each controller.

Figure 4:
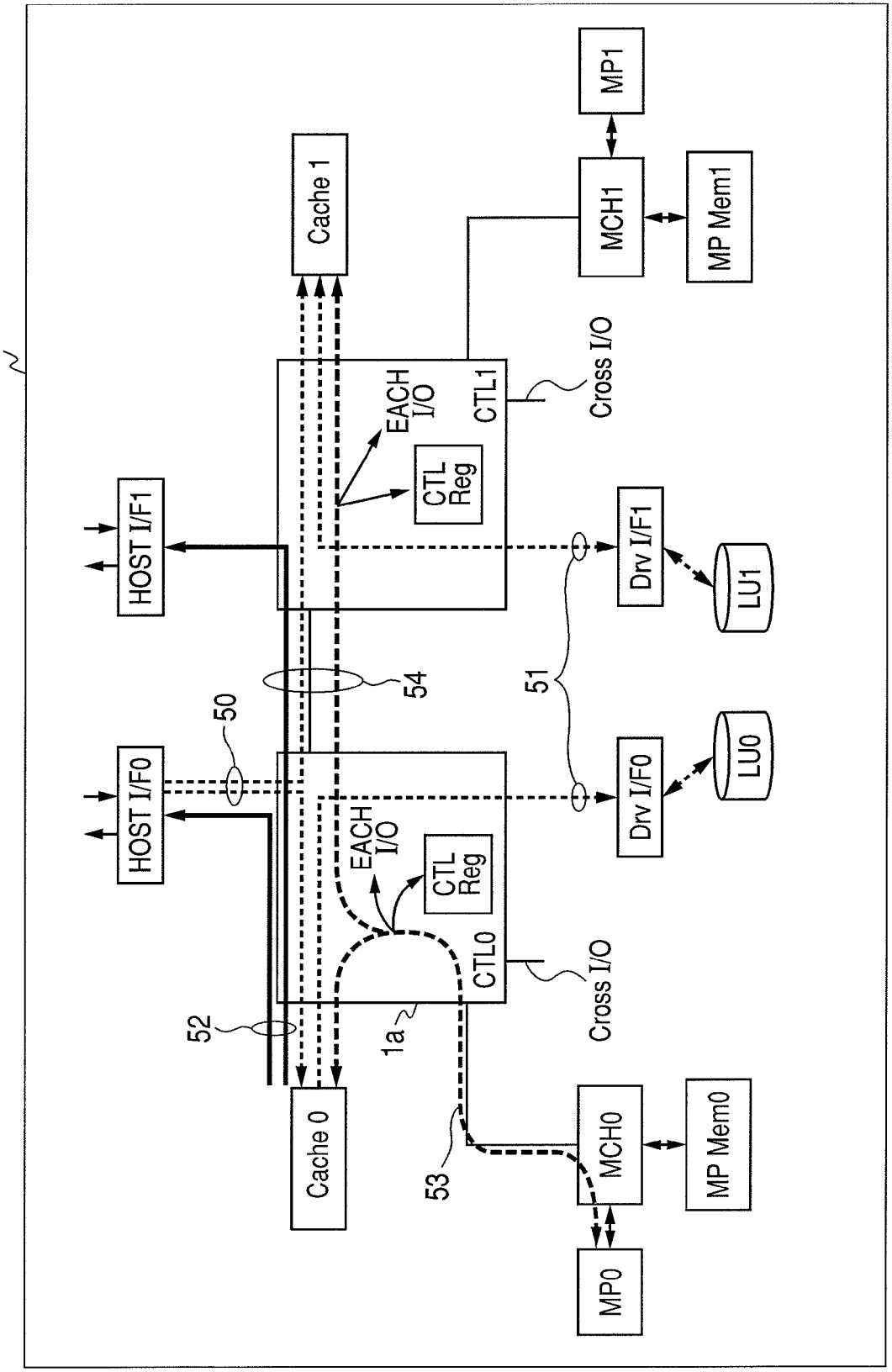
FIG. 4 is a diagram illustrating data transfer paths in the data storage apparatus.

Data transfer within the storage apparatus 100 is described by referring to FIG. 4. One example of the data transfer is given below.

Indicated by 50 is dual writing for writing into cache memories respectively connected with a controller to which the host interface receiving host data and a controller connected via the dual data transfer path (Dual I/O).

Indicated by 51 is processing for transfers to or from drive interfaces. The processing includes transfer of data in a cache memory to a drive interface and transfer of data received by the drive interface to the cache memory.

Indicated by 52 is processing (Host transfer) for transferring data in a cache memory to a host interface.

Indicated by 53 are MP accesses that are data transfers between a microprocessor and controller register, cache memory, host interface, drive interface within a controller.

The microprocessor 5a or 5b controls the controller 1a or 1b to perform the various transfer operations 50-53. A specific example of control method used when each transfer operation is performed is described below.

An operation for transferring data to the host by combining the processing 51 for transfer to or from a drive controller and the processing 52 for transfer to the host is first described. As an example, in response to an access from the host, data is read from the logical volume LU0 and routed to the cache memory (Cache0). The data is then transferred from the cache memory (Cache0) to each host interface (Host I/F). This is further described below.

The microprocessor (MP0) for operating the controller 0 (CTL0) controlling the logical volume LU0 activates the DMA circuit 14b (D DMA) within the controller (CTL0) such that data read from the logical volume LU0 is routed to the cache memory (Cache0). Then, the microprocessor (MP0) activates the DMA circuit 14a (H DMA) within the controller (CTL0) to which the destination host interface (Host I/F0) belongs and transfers data for the logical volume (LU0).

An operation for achieving data transfer (LU write) to a controller (LU0 or LU1) by combining the dual writing 50 into the cache memories with the transfer 51 to or from a drive controller is described below. As an example, a case in which data from the host is received by the host interface (Host I/F0), the data is written into both cache memories (Cache0 and Cache1), and then the data is transferred from the cache memory (Cache0) to the drive interface (Drv I/F0) with which the logical volume (LU0) is connected is now described. The processing 50 for writing into the two cache memories is performed by the microprocessor (MP0) that operates the controller 0 (CTL0) controlling the host interface (HOST I/F0). In particular, in response to data to be transferred to the host interface (Host I/F0), the microprocessor (MP0) activates the DMA circuit 14a (H DMA) within the controller (CTL0). Furthermore, the DMA circuit (H DMA) is instructed that the transfer destinations are the Cache data transfer path and Dual data transfer path. TLP is created in the bridge circuit (BRG H) for each transfer destination and transferred. This is achieved by specifying a completer ID within the TLP header of FIG. 3. After writing into the cache memory (Cache0), the microprocessor (MP0) activates the DMA circuit 14b (D DMA) within the controller (CTL0), and the data is transferred to the logical volume (LU0).

Within the storage apparatus, in response to a transfer request from the host, transfer operations take place for plural host interfaces and drive interfaces at the same time. Accordingly, data undergoing the transfer operations are time shared, multiplexed, and transferred through the dual data transfer path (Dual I/O). Furthermore, control data is frequently transferred by the microprocessor. Consequently, the data multiplicity increases, which in turn frequently induces switching of transfer path for data multiplexing at the high-speed switch 15 (SW) within the controller. This increases the time of overhead when switching is done. In consequence, the transfer band of the dual data transfer path (Dual I/O) is wasted, and the data transfer rate deteriorates.

Figure 5:
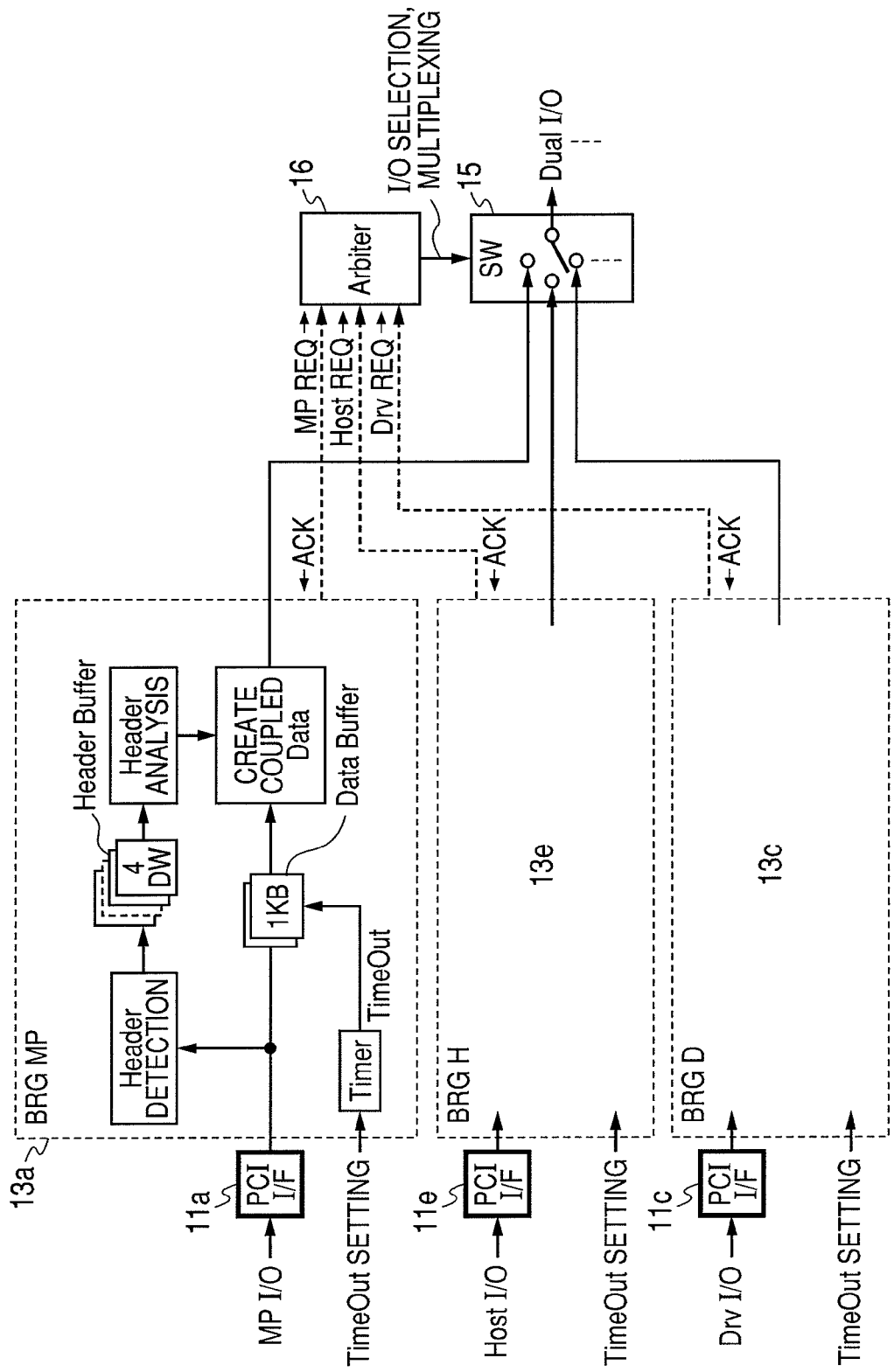
FIG. 5 is a diagram illustrating a bridge circuit configuration and constituent elements associated with data transfer to and from data transfer paths.

Embodiment 1 is next described by referring to FIG. 5. FIG. 5 is a block diagram showing parts of a controller for time sharing and multiplexing data from data transfer paths (MP I/O, Host I/O, and Drv I/O) connected with microprocessor, host, and drive controller using the high-speed switch (SW) 15 and transferring the data to the dual data transfer path. Furthermore, the bridge circuits (BRG MP) 13a, (BRG D) 13c, and (BRG H) 13e for processing variable-length packets are shown in detail. Each bridge circuit is composed of a header detection portion for detecting the header of data received by the PCI I/F, a header buffer for holding the header, a header analysis portion for analyzing the information contained in the header, a data buffer for holding data, a timer used for timeout processing for forcibly performing reading from the buffer, and a coupled data creation portion for combining data sets of shorter transfer lengths into a coupled data set and attaching header information to the coupled data set.

The header buffer capacity corresponds to 4 DW of header length of FIG. 3. This is only one example of the header buffer capacity. The invention is not limited to this example. Two header buffers are provided to perform processing on plural sets of header information described by referring to FIG. 6. The number of header buffers is not limited to this.

The data buffer capacity corresponds to the maximum transfer length of 1,024 bytes (1 K byte) of data in TLP format and thus includes 1 KB for data, 4 DW for the TLP header, and 1 DW for a compensation code (ECRC). Two or more buffers are provided to permit writing to the buffers from the PCI I/F and, at the same time, reading from the buffers when transfer to the high-speed switch is effected. The data buffer capacity is not limited to the above-described value, in the same way as the header buffer capacity. However, it is desired that the data buffer capacity is greater than the header buffer capacity.

If the received data is kept in the buffers, the processing for transfers as described in connection with FIG. 4 will stagnate and the data-transferring performance will be deteriorated. Accordingly, each bridge circuit has the timer. The timer begins to count when writing into a data buffer is started and shifts to timeout processing when a timeout value is reached (i.e., the timer times out).

In the timeout processing, all data within the data buffers are read out forcibly and transferred. The timeout period is set by the microprocessor. Although all the data in the buffer is read out by the timeout processing, the data is transferred while the data buffer capacity is not filled. Therefore, when the data received and held in the buffer is transferred, the data is transferred together with an amount of dummy data corresponding to the difference between the data capacity and the total data buffer capacity. The dummy data is ineffective data that is discarded at the transfer source or transfer destination. Accordingly, if the amount of dummy data increases, the transfer path band is wasted. The rate of the amount of effective data to the amount of data transferred per unit time decreases. This will lead to a decrease in actual transfer rate.

The arbiter 16 controls data multiplexing on the high-speed switch (SW) in response to a request signal created by a bridge circuit when a timeout occurs or after the end of writing of data corresponding to the buffer capacity, and transfers the data to the dual data transfer path. The bridge circuit receives a transfer completion acknowledgement (ACK) from the arbiter and transfers the data held in the buffer. Then, the bridge circuit opens the data buffer and begins to buffer the next received data.

For the sake of convenience, the cache data transfer path is not shown in FIG. 5. However, it is also conceivable that data is transferred from the cache data transfer path to the dual data transfer path.

Figure 6:
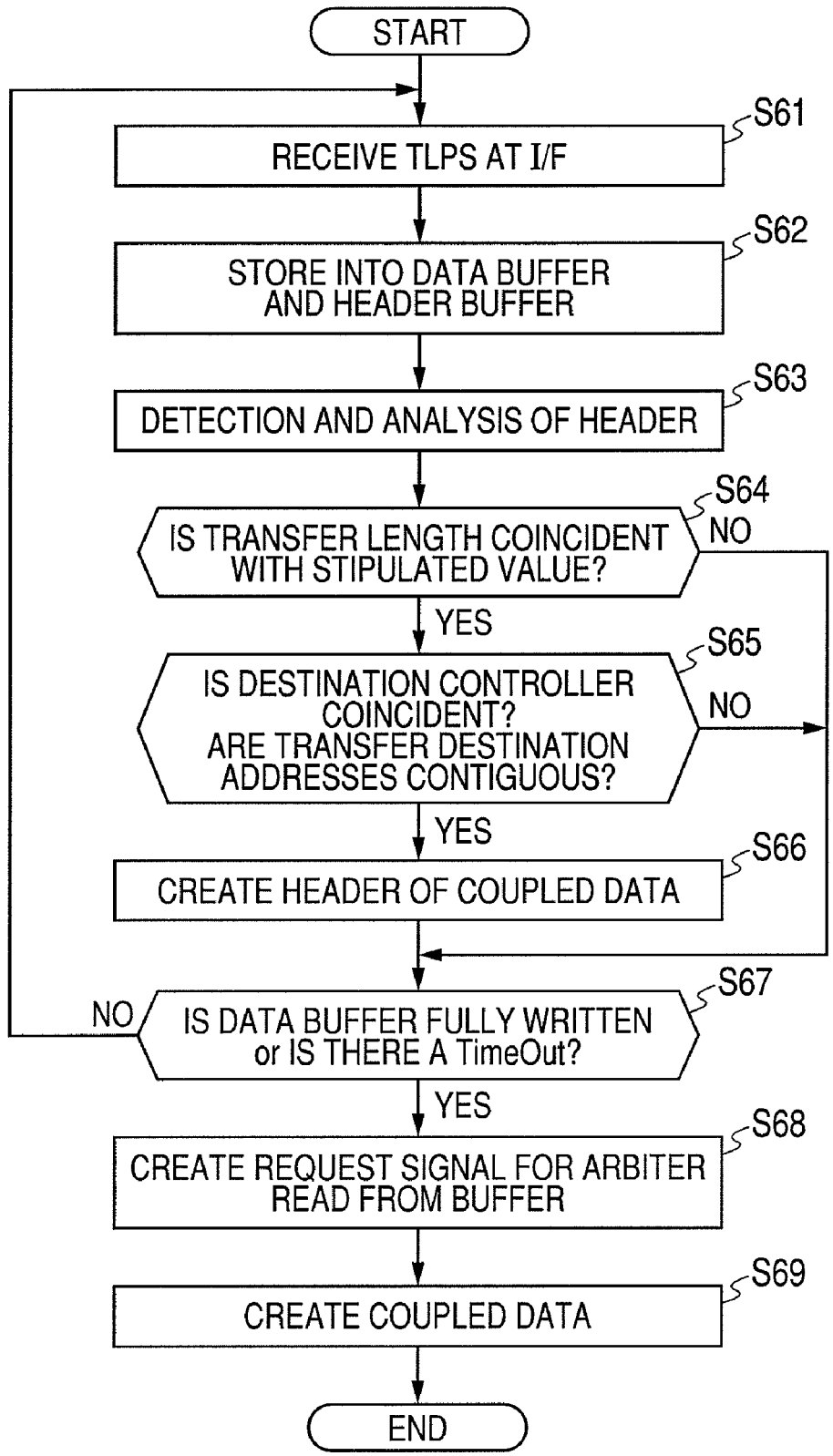
FIG. 6 is a flowchart illustrating a method of transferring data in accordance with a first embodiment of the present invention.

The processing performed in the bridge circuit to create coupled data is next described by referring to the flowchart of FIG. 6, which illustrates a method of making a decision in a case where a coupled data set is created from received plural data sets and a method of controlling transfer to the high-speed switch (SW).

First, data is received via each interface (S61). Then, the received data is stored in the data buffer. The header of the data is stored in the header buffer. Whenever data is received, the data is similarly stored in the data buffer and header buffer (S62).

When the headers of plural data sets are stored in the header buffer, the header analysis portion detects and analyzes various kinds of information (e.g., transfer length, controller number of the transfer destination, transfer destination, and transfer destination address) included in the headers (S63). A decision is made from the result of the analysis as to whether the transfer length of each data set has a stipulated transfer length (S64). For example, the minimum access unit of 1 DW (4 bytes) is the stipulated transfer length. A decision is made as to whether the transfer lengths of two or more data sets are coincident with the stipulated length. If the decision at step S64 is negative, program control proceeds to step S67, which will be described later.

If the decision at step S64 is affirmative (Yes), a decision is made from two or more sets of header information regarding coincidence of the controller numbers of the transfer destinations, coincidence of the transfer destinations, and transfer destination address continuity (S65). If the decision at step S65 is negative, program control goes to step S67. If the decision at step S65 is affirmative (Yes), conditions under which plural received data sets can be combined into one data set and can be transferred as a coupled data set hold. Header information about the coupled data is created. The header information includes the first-position address value of the transfer destination included in the coupled data set and the transfer length of the coupled data set (S66).

Then, decisions are made on the data buffer capacity and as to whether a timeout has occurred (S67). If the amount of the received data satisfies the data buffer capacity or when a timeout has occurred, a request signal is created for the arbiter 16. When an acknowledgement signal from the arbiter is received, reading of data from the data buffer is started (S68). If the decision at step S67 is negative, the processing starting with step S61 is continued. After the start of data transfer, first-position data contained in the coupled data is read out. The header created at step S66 is attached, thus creating coupled data (S69). Then, the coupled data is time shared and multiplexed with other data by the high-speed switch (SW) and transferred. Then, the data is output to the transfer destination through the dual data transfer path.

The decision made at the step S64 is not limited to that the transfer length is the minimum access unit of 1 DW (4 bytes). Alternatively, a decision may be made as to whether the transfer lengths contained in the held plural sets of header information are coincident. In this case, with respect to a decision on the address continuity at step S65, the coincident transfer length is the variation in the address value. The address continuity can be checked if the following conditional formula is satisfied:

(transfer address of a header)+(transfer length detected to be coincident)=(transfer address of the next header)

Still alternatively, the decision at step S64 may be made as to whether the transfer length is less than a stipulated transfer length.

The present embodiment makes a decision on creation of coupled data, based on the decision conditions of steps S64 and S65. A decision may also be made on creation of coupled data, based on only the result of the decision at step S65. For example, where the transfer length is different (i.e., the decision at step S64 is negative), plural data sets can be combined into one data set if address continuity is confirmed (i.e., the decision at the step S65 is affirmative (Yes)). In this case, the address continuity can be confirmed at the step S65 if the following conditional formula is satisfied:

(transfer address of a header)+(transfer length of the header)=(transfer address of the next header)

According to the decision at the step S64, plural data sets having short transfer lengths can be combined into one coupled data set. The overhead can be reduced. Furthermore, according to the decision at the step S65, coupled data taking account of the conditions of the transfer destination can be made. Because the controllers at the transfer destinations are the same and because the transfer addresses are continuous, an assemblage of data can be directly written without resolving the data.

Figure 7A:
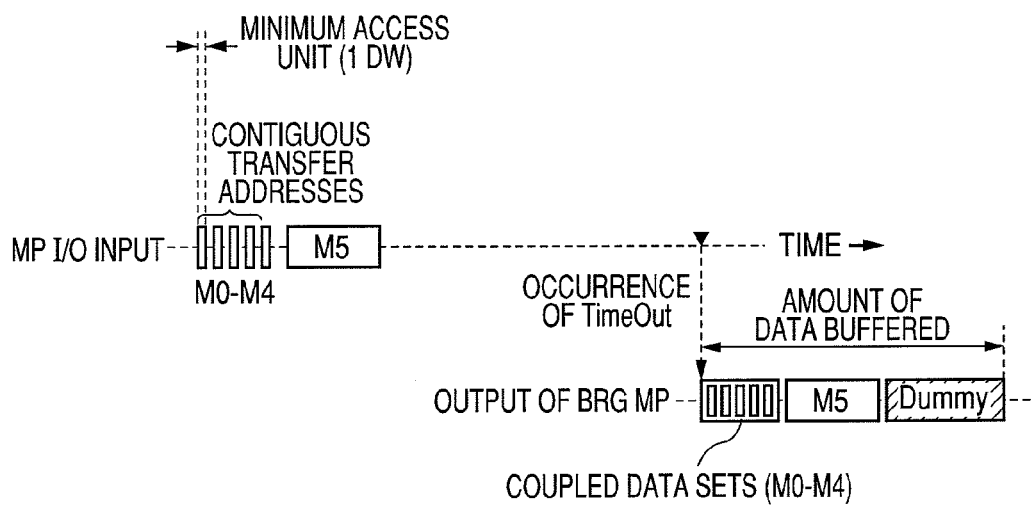
FIGS. 7A and 7B are diagrams illustrating processing for transferring data within the bridge circuit of the first embodiment of the invention.

An operation (FIG. 7A) performed in the bridge circuits 13*a*, 13*c*, and 13*e* of FIG. 5 to create coupled data is described taking a specific example. As an example, FIG. 7A shows a case where a microprocessor transfers a sequence of data sets having a transfer length of 1 DW to the control register (CTL Register) 17 and data is forced to be read from the data buffer on occurrence of a timeout. More specifically, in this case, transferred data sets (M0-M4) having headers whose addresses are continuous and a data set (M5) having a large transfer length are received continuously at the I/F via the MP data transfer path. Subsequent data reception does not take place. One conceivable example of continuous data sets of 1 DW to be transferred is access to control registers having continuous addresses.

The header analysis portion of the bridge circuit (BRG MP) makes a decision as to whether the transfer lengths obtained from plural sets of header information held in the header buffers are coincident with a stipulated value. Controller numbers at the transfer destinations, coincidence of transfer destinations, and continuity of the addresses of the transfer destinations are judged. If the transfer lengths are coincident with the stipulated value, the controllers at the transfer destinations are coincident, and the addresses of the transfer destinations are continuous, then header information about coupled data created by combining the data sets having continuous addresses of the transfer destinations is created. The header information includes information indicating the controller number of the transfer destination and the transfer destination which are common with the transfer destination controller number and transfer destination about each transfer data set combined as coupled data. The transfer destination address is the first position address within each transferred data set collected as the coupled data.

Where a state in which there is no data transfer persists and a timeout occurs, a transfer request signal is issued for the arbiter 16. Data is forced to be read from the data buffer and transferred. The coupled data creation portion combines the header information about coupled data and data sets (M0-M4) into the coupled data during readout. The other data set (M5) and dummy data are read out intact and transferred to the high-speed switch (SW). When the coupled data is created, the compensation code (ECRC) is recalculated and attached. The recalculation of the compensation code (ECRC) is performed, for example, by the header analysis portion.

Figure 7B:
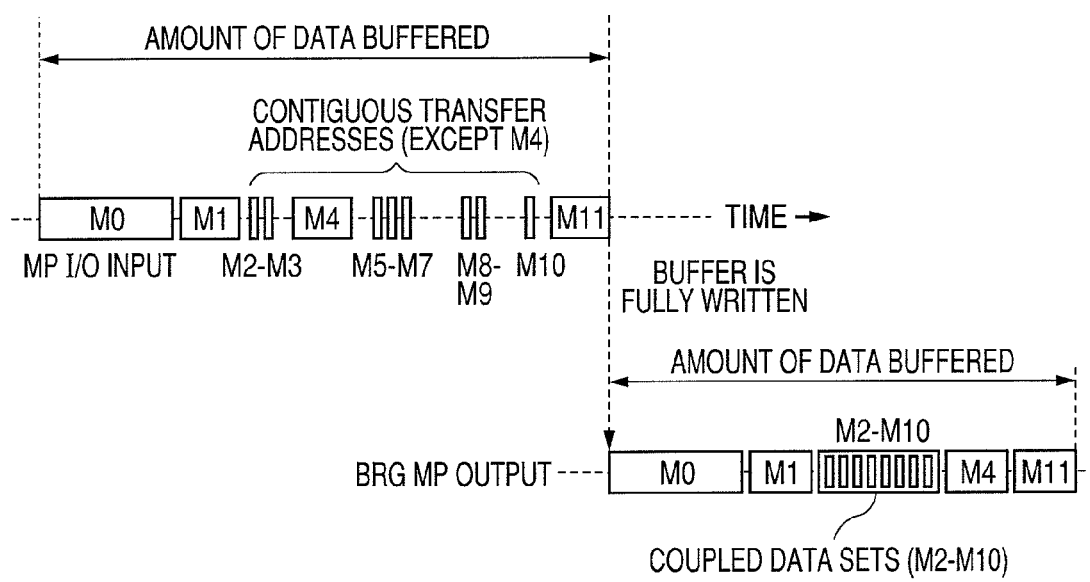

FIG. 7B shows a case in which the microprocessor mixes data sets having a transfer length of 1 DW with other data sets, transfers the resulting data to the control register (CTL Register) 17, receives data filling the data buffer capacity, and then transfers the data. In FIG. 7B, a succession of transfers of minimum access unit of 1 DW (M2 to M10 excluding M4) intermingles with transfers of data sets (M0, M1, M4, and M11) having large transfer lengths. The addresses contained in the headers of the data sets M2-M10 excluding M4 are continuous. In this case, coupled data is created by first reading out the M2-M10. Then, the data set (M4) of a discontinuous address is read out and transferred to the high-speed switch (SW).

The bridge circuit (BRG MP) creates header information about the coupled data in accordance with the flowchart of FIG. 6, in the same way as in FIG. 7A. However, the data set (M4) of the discontinuous address is present during the process. The data set can be detected and judged from the header information held in plural header buffers by a method similar to the foregoing method.

The header analysis portion may make decisions other than the decision about creation of coupled data. In particular, The header analysis portion can make decisions about the controller numbers at transfer destinations, coincidence of the transfer destinations, and address continuity of the transfer destinations. In addition, the header analysis portion may make a decision on the continuity of order of reception of data sets. For example, accesses to the microprocessor may form a control sequence in the order of transfer of data sets and control the controller and storage apparatus 100. It is conceivable that interchanges of order of transfers of data sets affect the order of reception and varies the intended control sequence of the microprocessor. Therefore, the above-described problem is solved by adding the decision on the continuity of reception. The decision on the address continuity within the front and rear head buffers permits check of the order of received data sets. For example, in FIG. 7B, in a case where the order of access to the data sets (M2-M10) is maintained, when reading is done from a data buffer, coupled data set 1 is created from data sets M2 and M3. Also, coupled data set 2 is created from data sets M5-M10. The bridge circuit outputs the coupled data set 1, data set M4, and coupled data set 2 in this order. The header analysis portion creates headers of the coupled data sets 1 and 2 by a method according to the above-described method of decision.

As described so far, plural data sets are combined into one coupled data set, based on transfer lengths, coincidence of transfer destinations, and continuity of transfer addresses. Thus, increase in multiplicity on the high-speed switch and increase in overhead time due to increase in multiplicity can be suppressed. Consequently, the transfer performance can be improved.

(2) Embodiment 2

Figure 9:
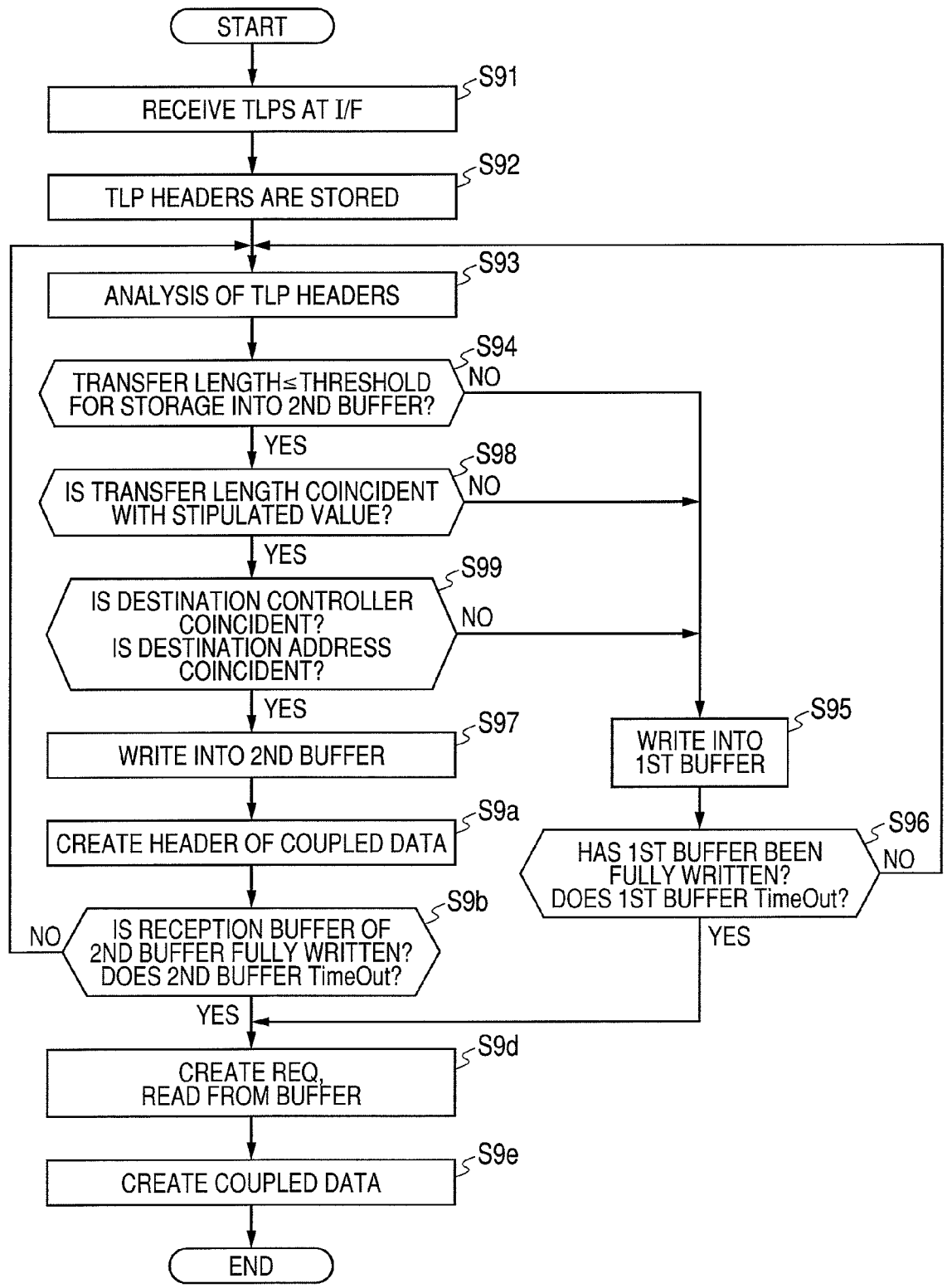
FIG. 9 is a flowchart illustrating a method of transferring data in accordance with the second embodiment of the invention.

Then, a second embodiment is next described by referring to FIGS. 8-10. Description of those portions of the second embodiment which perform processing similar to the processing done by their counterparts of embodiment 1 may be omitted. The configuration of FIG. 8 time shares and multiplexes variable-length packets transferred from the data transfer paths (MP I/O, host I/O, and Drv I/O) connected with microprocessors, hosts, and drive interfaces by the high-speed switch (SW) 15 and transfers the packets to the dual data transfer path, in the same way as in FIG. 5. The structures of the bridge circuits (BRG MP 13a, BRG H 13e, and BRG D 13c) for processing the variable-length packets are shown in detail. Each bridge circuit includes the components of FIG. 5, i.e., header detection portion, header buffer, header analysis portion, and coupled data creation portion. In addition, the bridge circuit has a first buffer for holding data sets having transfer lengths greater than a given length and a second buffer for holding data sets having transfer lengths smaller than the given length. Moreover, the bridge circuit includes timers 0 and 1 to judge whether the first and second buffers, respectively, have timed out.

The capacities of the head buffer and first buffer are determined by a method similar to the method already described in connection with FIG. 5. One example of method of determining the capacity of the buffer is as follows. The buffer capacity of the header buffer is a header length of 4 DW. The buffer capacity of the first buffer is the maximum transfer length of data (i.e., 1024 bytes (1 KB)) plus 4 DW for the header and 1 DW of the compensation code (ECRC). Two or more buffers are provided to permit writing into the buffer from the PCI I/F and, at the same time, reading from the buffer concomitantly with transfer to the high-speed switch. The writing and reading may be done with one buffer.

Where the minimum transfer length within the controller is 64 bytes (16 DW), the buffer capacity of the second buffer is the sum of the capacity of the data, 4 DW for the header, and 1 DW of the compensation code (ECRC). Where data sets each having a length of less than 64 bytes (e.g., having a minimum transfer length of 1 DW) are transferred, the data sets are combined into one coupled data set. Where the buffer capacity of the first buffer is set larger than the buffer capacity of the second buffer, data sets having short transfer lengths can be transferred quickly with a minimum transfer delay. This is preferable for access to a microprocessor. Two or more buffers are provided for the same reason as for the first buffer.

It is to be noted that the above-described method of setting the buffer capacities merely shows one example. The invention is not limited to this example.

The timers 0 and 1 are set to independent timeout values. Because the buffer capacity of the first buffer is larger than the buffer capacity of the second buffer, the timeout value of the first buffer is set larger than the timeout value of the second buffer by the microprocessor. Therefore, the second buffer times out more frequently and permits quicker transfers. Furthermore, the buffer capacity is minimized. This enables transfer while minimizing the amount of dummy data produced concomitantly with forced reading when a timeout occurs. The second buffer is adapted for microprocessor accesses frequently producing short data sets to be transferred. However, a common timeout value may also be set.

After the first and second buffers have been fully written or when timeout processing is started on occurrence of a timeout, the arbiter 16 receives the request signal created by the bridge circuit and controls data multiplexing on the high-speed switch (SW) based on the request signal. The bridge circuit receives the transfer acknowledgement (ACK) signal from the arbiter and transfers data within the buffer. Then, the bridge circuit frees up the buffer and starts to buffer the next received data.

The transfer destination is not limited to the dual data transfer path in the same way as in the case of FIG. 5. Similar circuits are incorporated in each bridge circuit and high-speed switch (SW) within each controller for the various data transfer paths including cache data transfer path, host data transfer path, and drive data transfer path. The bridge circuits (BRG MP, BRG H, and BRG D) are identical in configuration.

The cache data transfer path is not shown in FIG. 8. The present embodiment can be applied to the case where data is transferred from the cache data transfer path to the dual data transfer path. This is achieved by providing a portion corresponding to the bridge circuit into the memory controller (MEM CTL) 12 and activating the multi DMA 20.

Processing for creating coupled data and transferring it is next described by referring to the flowchart of FIG. 9. In the control sequence shown in FIG. 9, packets are received by the I/F, a buffer to which TLPs should be written is selected based on the transfer lengths, a decision is made as to whether coupled data should be created, and the data is transferred to the high-speed switch (SW).

The processing from step S91 to S93 corresponds and similar in content to the processing from step S62 to S63 of FIG. 6 and so description of the former processing is omitted. After the step S93, a buffer into which received data should be stored is selected according to the transfer length of the header stored in the header buffer (S94). The header analysis portion analyzes the transfer lengths of data sets and makes a decision as to whether the transfer lengths are less than the threshold value for storage in the second buffer. The decision condition is a decision made as to whether data should be stored in the second buffer. The threshold value for storage in the second buffer is obtained, for example, by dividing the buffer capacity of the second buffer by M.

M is a positive integer and greater than 1. By specifying the value of M, plural data sets are stored in the second buffer, and the data sets can be combined into one coupled data set. For example, where M=2, the threshold value is ½ of the buffer capacity of the second buffer. This means that two data sets to be transferred are stored in the second buffer and combined into one coupled data set. Threshold values for M=3 and M=4 are similarly used to combine three and four data sets to be transferred into coupled data sets. Alternatively, the threshold value for storage in the second buffer may be set to a given value.

If the decision at step S94 is negative, writing into the first buffer is done (S95). If the buffer capacity of the first buffer is filled or a timeout occurs, program control proceeds to the processing starting with step S9*d* (S96). The processing of steps S9*d* and S9*e* corresponds to the processing of steps S68 and S69 of FIG. 6 and so description of the processing is omitted.

If the decision at step S94 is affirmative (Yes), the processing from step S98 to step S9*b* is performed. The processing of steps S98 and S99 corresponds to the processing of steps S64 and S65 of FIG. 6 and so description of the processing of S98 and S99 is omitted. If the decisions at the step S98 and S99 are affirmative (Yes), writing into the second buffer is done (S97). Subsequent processing of the steps S9*a* and S9*b* corresponds to the processing of the steps S66 and S67 of FIG. 6 and so description of the processing of S9*a* and S9*b* is omitted.

Figure 10A:
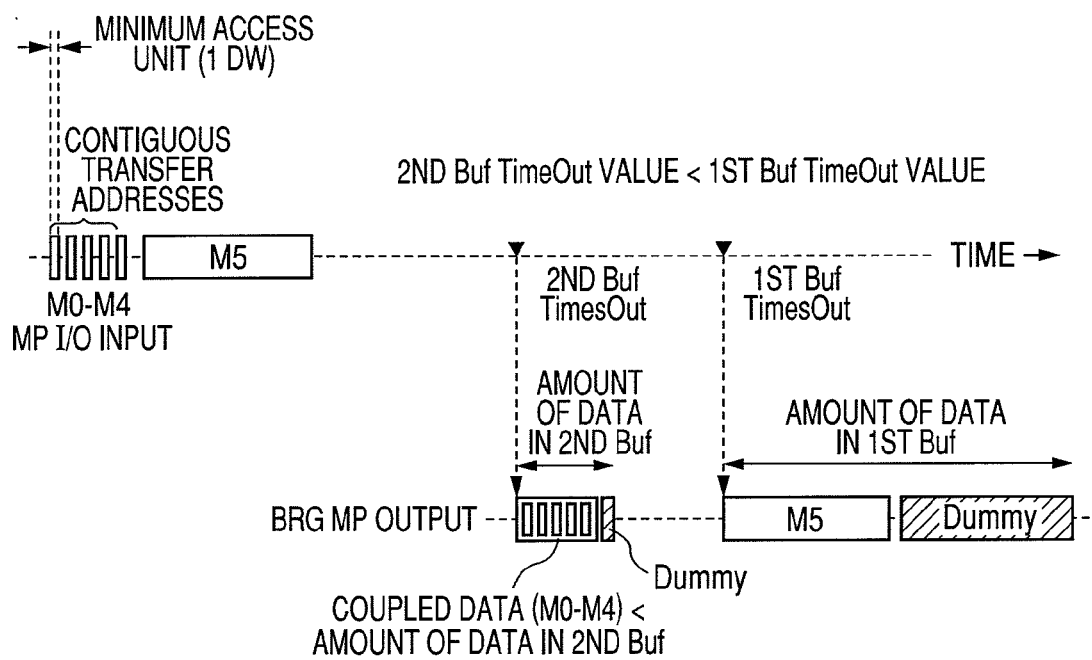
FIGS. 10A and 10B are diagrams illustrating processing for data transfer within the bridge circuit of the second embodiment of the invention.
Figure 10B:
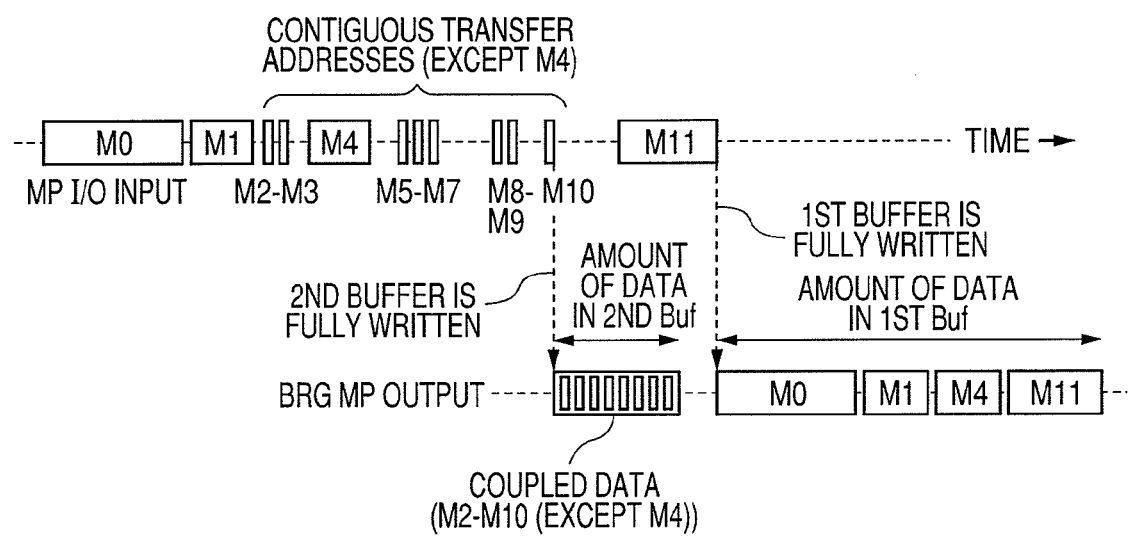

A specific example of an operation for creating coupled data by the bridge circuits 13*a*, 13*c*, and 13*e* of FIG. 8 in accordance with the control sequence of the flowchart of FIG. 9 is now described by referring to FIGS. 10A and 10B. FIG. 10A shows one example in which a microprocessor transfers data sets having a transfer length of 1 DW in succession to the control register (CTL Register) 17 and forcibly reads data from the buffer on occurrence of a timeout. In particular, transferred data sets (M0-M4) having headers whose addresses are continuous and a data set (M5) having a large transfer length are received in succession at the I/F via the MP data transfer path. Subsequent data reception does not take place. One conceivable example of continuous data sets of 1 DW transferred is access to control registers having continuous addresses. The total amount of data of the data sets M0-M4 is less than the buffer capacity (e.g., 64 KB) of the second buffer. The amount of data of the data set M5 is less than the buffer capacity (e.g., 1 KB) of the first buffer.

The header analysis portion of the bridge circuit (BRG MP) analyzes the headers, creates header information for coupled data, and performs timeout processing in the same way as in the operations described in connection with FIGS. 7A and 7B. However, where data sets (M0-M4) having transfer lengths shorter than the threshold value for the second buffer is detected by the header analysis portion, the data sets are successively stored in the second buffer. The other data set (M5) is stored in the first buffer. Because the timers measure for the respective buffers to detect whether timeouts have occurred, timeout operations are performed independently. In FIG. 10A, the second buffer having a smaller timeout value times out. Timeout processing is initiated first. Then, the first buffer times out, and timeout processing is commenced. The coupled data creation portion creates a coupled data set from the header information created when data is read from the second buffer and from the data sets (M0-M4) that are to be combined. The other data set (M5) and dummy data are read out intact and transferred to the high-speed switch (SW).

FIG. 10B shows a case in which a microprocessor transfers an combination of data sets having a transfer length of 1 DW and other data sets to the control register (CTL Register) 17, receives data filling the buffer capacity, and then transfers the data. In FIG. 10B, a succession of transferred data sets (M2-

M10 excluding M4) of minimum access unit of 1 DW intermingles with transferred data sets (M0, M1, M4, and M11) having large transfer lengths. The addresses contained in the headers of the data sets M2-M10 excluding M4 are continuous. In this case, the data sets M2 to M10 are read out first, and a coupled data set is created. Then, the data set (M4) of a discontinuous address is read out and transferred to the high-speed switch (SW).

The bridge circuit (BRG MP) creates header information about the coupled data in the same way as the operation described in connection with FIG. 7A. However, where the head analysis portion detects data sets (M2-M10 excluding M4) having transfer lengths smaller than the threshold value for storage in the second buffer, TLPs are successively stored in the second buffer. The other received TLPs (M0, M1, M4, and M11) are successively stored in the first buffer.

After writing of data sets (M2-M10 excluding M4) into the second buffer is continued and the buffer capacity of the second buffer is filled, reading is started. The data sets M2-M10 excluding M4 are read out, and a coupled data set is created by a method similar to the method already described in connection with FIG. 7A. Furthermore, writing of data sets (M0, M1, M4, and M11) into the first buffer is continued and the buffer capacity of the first buffer is filled. Then, reading is started. The coupled data created by reading from the second buffer and the data sets (M0, M1, M4, and M11) contained in the data read from the first buffer are transferred to the high-speed switch (SW).

Also, in the example of transfer of FIG. 10B, check of continuity of order of received data sets is added to the check of address continuity performed by the header analysis portion. Consequently, coupled data can be created while maintaining the order of reception of data sets. When an output is produced from the bridge circuit, the order in which data sets are read from the second and first buffers can be made identical with the order in which the data sets were received.

In the examples of FIGS. 10A and 10B, the head analysis portion can make a decision on the continuity of reception orders of data sets, as well as decisions on control numbers, coincidence of transfer destinations, and address continuity, to make a decision as to whether coupled data should be created, in the same way as in FIG. 6. For example, coupled data can be created while maintaining the order of accesses to the microprocessor.

As described so far, buffers having different capacities are selected according to the transfer lengths of received data sets. Data sets having the same transfer destination, short transfer lengths, and continuous transfer addresses are detected. The data sets are stored in the second buffer and combined into a coupled data set. Consequently, the packet multiplicity on the high-speed switch can be suppressed. In addition, generation of data transfer overhead can be suppressed. As a result, packets can be transferred efficiently. The second embodiment yields the same advantages as the first embodiment. In addition, the second embodiment can further shorten the transfer delay time of data sets having short transfer lengths by providing the second buffer.

In the second embodiment, a case in which the second embodiment is combined with the first embodiment for creating coupled data has been described. The present invention is not limited to this. Transfer delay and deterioration of transfer performance accompanying dummy data can be suppressed simply by controlling writing and reading into and from the second and first buffers having different capacities according to the transfer lengths of received data sets.

(3) Embodiment 3

Figure 11:
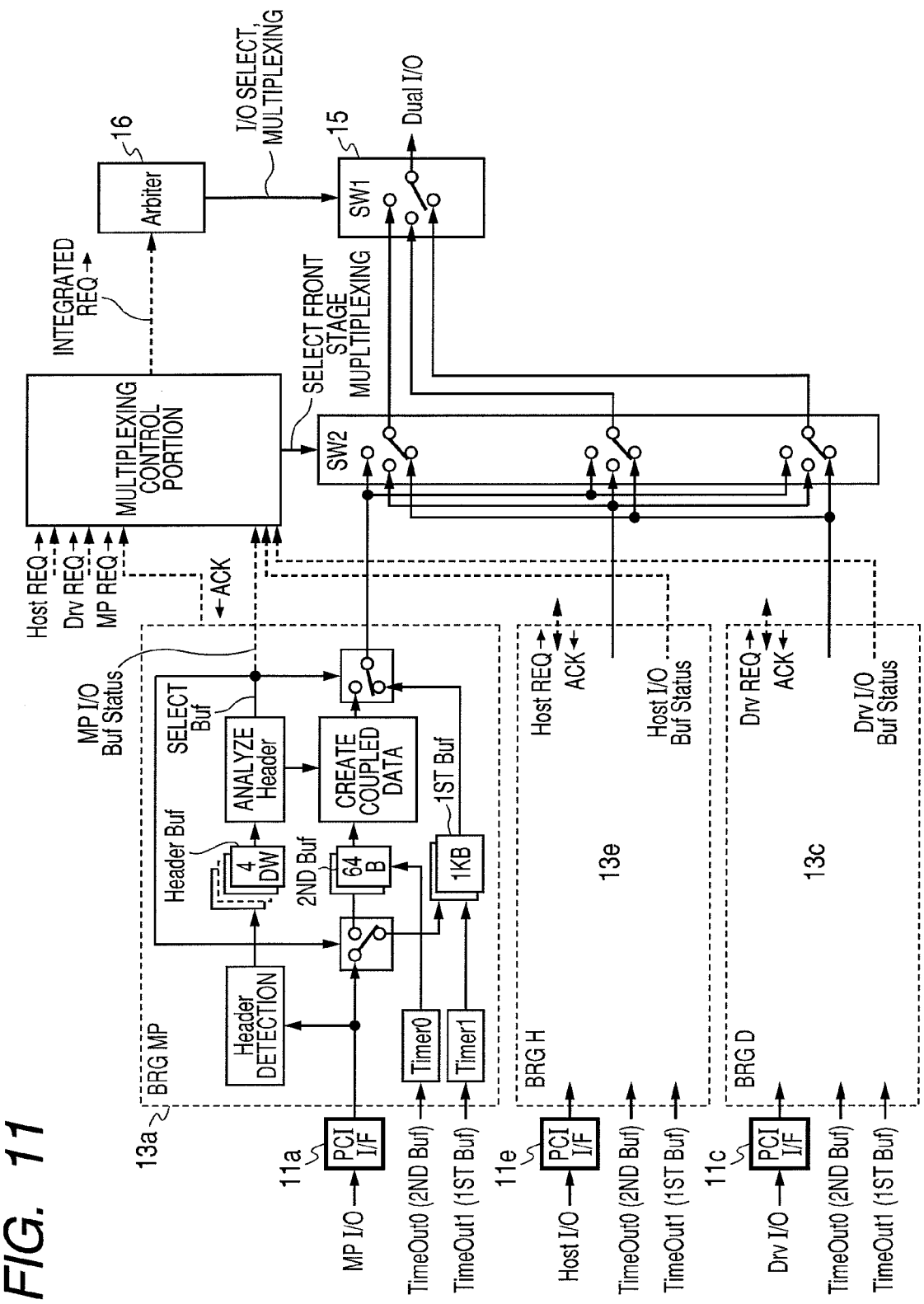
FIG. 11 is a diagram illustrating the configuration of a third embodiment of the invention and constituent elements associated with data transfer to and from data transfer paths.
Figure 12:
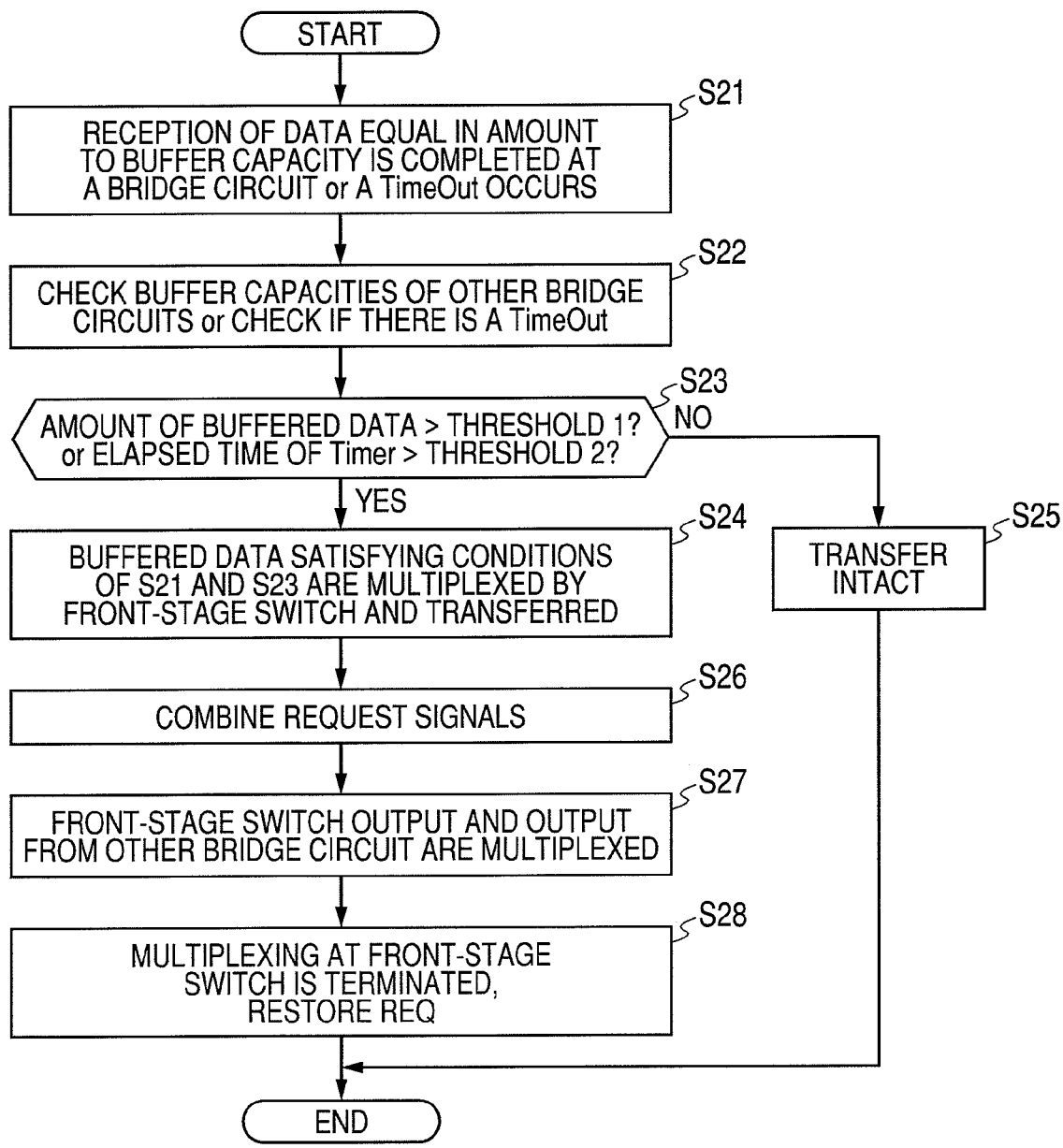
FIG. 12 is a flowchart illustrating a method of data transfer according to the third embodiment of the invention.
Figure 13:
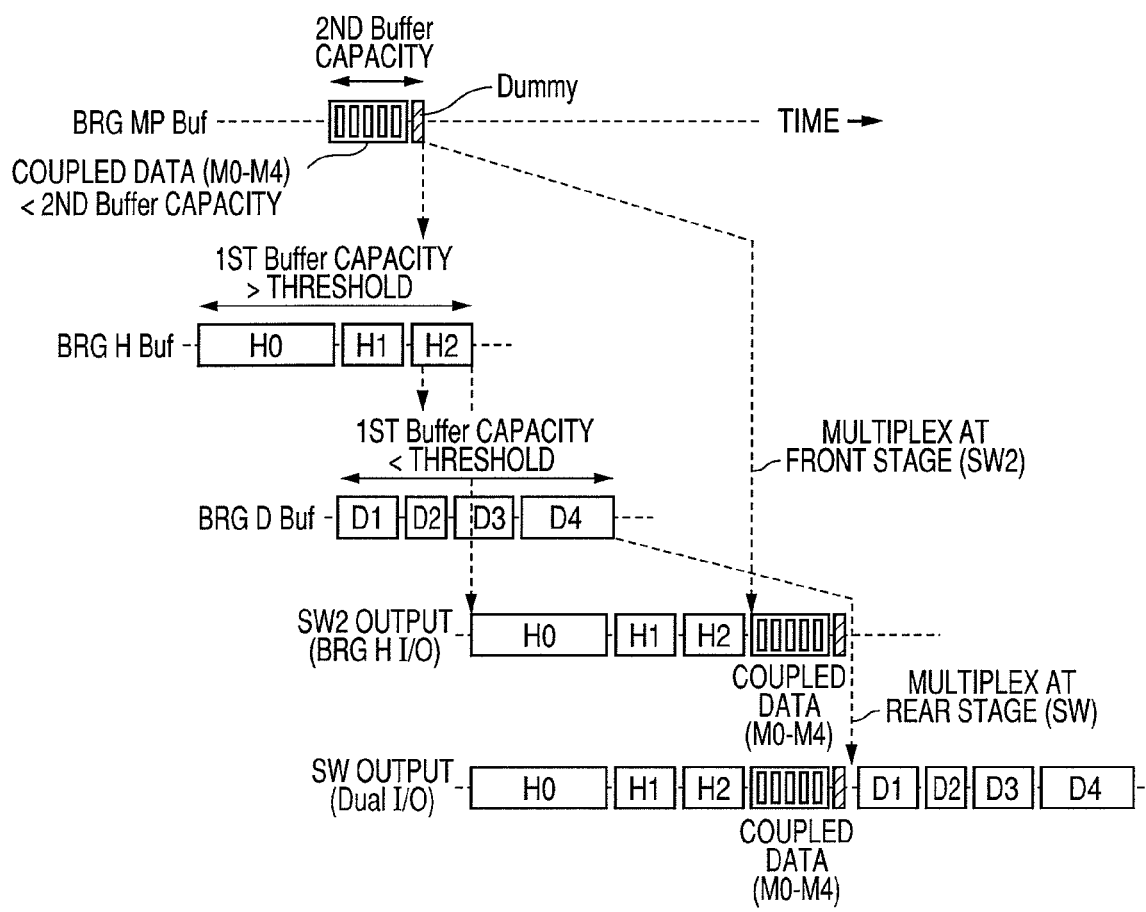
FIG. 13 is a diagram illustrating processing for data transfer within the configuration of the third embodiment of the invention.

Embodiment 3 is next described by referring to FIGS. 11-13. Description of those portions of Embodiment 3 which are identical with their counterparts of Embodiments 1 and 2 may be omitted. FIG. 11 is a diagram showing parts of the internal configuration of a controller that time shares and multiplexes variable-length packets at the high-speed switch (SW) 15, the packets being transferred via the various data transfer paths (MP I/O, host I/O, and Drv I/O) connected with the processor, host, and drive controller, in the same way as in FIG. 8. Then, the data is transferred to the dual data transfer path. The bridge circuits (BRG MP 13a, BRG H 13e, and BRG D 13c), high-speed switch (SW) 15, and arbiter 16 processing variable-length packets are the same as their counterparts of FIG. 8 and so their description is omitted.

In FIG. 11, a front-stage switch (SW2) is mounted between each bridge circuit and the high-speed switch (SW). There is provided a multiplexing control portion for selecting and controlling data multiplexed by the front-stage switch. The front-stage switch (SW2) multiplexes the selected outputs from the bridge circuits ahead of the post-stage high-speed switch (SW).

The multiplexing control portion combines plural request signals multiplexed at the front-stage switch into one and outputs the integrated request signal to the arbiter. The multiplexing control portion receives signals indicating the status (e.g., the amount of data written into each buffer and as to whether a timeout has occurred) of the buffers of the bridge circuits, and manages the buffer status.

The front-stage switch (SW2) is controlled by the multiplexing control portion. This reduces the number of time shared and multiplexing operations on the high-speed switch (SW), thus suppressing overhead.

In the present embodiment, the bridge circuits of embodiment 2 are adopted as bridge circuits. The invention is not limited to this. The bridge circuits of embodiment 1 may also be adopted.

A method of selecting a bridge circuit output multiplexed at the front-stage switch (SW2) and processing for transferring a request signal to the arbiter 16 are described next by referring to the flowchart of FIG. 12.

When the amount of data stored in a buffer (first buffer or second buffer in the present embodiment) within a bridge circuit reaches the buffer capacity or when a timeout occurs, preparations for transfer from the buffer are completed (S21). The multiplexing control circuit acquires a buffer status signal about other I/O in response to the completion of preparations for transfer from the buffer included in the bridge circuit (S22). A decision is made as to whether data held in the buffer (S21) prepared to transfer data should be multiplexed by the front-stage switch (SW2) with data held in a buffer contained in other bridge circuit (S23). More specifically, the amount of data in the second or first buffer is compared with the first threshold value. The elapsed time since the start of writing into the second or first buffer is compared with the second threshold value to thereby select the multiplexed buffer contained in other bridge circuit. The first and second threshold values are determined according to the second and first buffers. The multiplexed buffer may be selected based on the result of a comparison with the first or second threshold value.

If the decision at step S23 is negative, data is transferred from the bridge circuit of the buffer (S21) prepared to transfer data, via the front-stage switch (SW2) and post-stage switch (SW) (S25).

If the decision at step S23 is affirmative (Yes), the multiplexing control portion controls the front-stage switch (SW2) according to a transfer request signal from each bridge circuit. Data held in the buffer (S21) within the bridge circuit prepared to transfer data is time shared and multiplexed with data held in other bridge circuit for which the condition of S23 holds, at the front-stage switch (SW2) (S24). In particular, data held in the bridge circuit of the buffer (S21) prepared to transfer data is transferred. Then, data is read from the bridge circuit for which the condition of S23 holds, time shared, and multiplexed at the front-stage switch (SW2). The data is then transferred to the high-speed switch (SW). The order of transfer may be so set that data held in the buffer (S21) prepared to transfer data may be transferred after the data held in other bridge circuit for which the condition of S23 holds is transferred.

The multiplexing control portion combines request signals of plural data sets multiplexed at the front-stage switch (SW2) into one request signal when data are multiplexed at the front-stage switch (SW2). The integrated request signal is transferred to the arbiter 16 (S26). As an example, the request signal of S23 is combined with the request signal from the bridge circuit for which the condition of step S21 holds.

Furthermore, the arbiter 16 controls the post-stage high-speed switch (SW) such that the output from the front-stage switch (SW2) and the output from other bridge circuit are multiplexed according to the integrated request signal from the multiplexing control signal and according to other request signal (S27).

After the end of data transfer, i.e., the processing from step S21 to step S27, the multiplexing at the front-stage switch is terminated. the request signal to the arbiter 16 is terminated. The arbiter is restored to their original status where they are ready to accept request signals from the bridge circuits (BRG MP, BRG H, and BRG D) (S28).

If the controller of embodiment 3 is used, transferred data sets satisfying the conditions of steps S21 and S23 are multiplexed at the front-stage switch. Then, the data is multiplexed with other transferred data at the post-stage switch. In consequence, generation of transfer overhead due to multiplexing at the post-stage switch can be suppressed. Hence, packets can be transferred efficiently. Furthermore, data sets that can be immediately transferred can be combined into one at the front stage and transferred by selecting transferred data sets to be multiplexed at the front stage under the condition of step S23. Hence, generation of overhead at the post-stage switch can be suppressed.

The data stored in a buffer as set forth in step S21 may be restricted to data held in the second buffer and multiplexed with data held in other buffer. Furthermore, the buffer for which a decision is made in step S23 may be restricted to the second buffer. In this case, TLPs having small transfer lengths are multiplexed at the front-stage switch (SW2). As a consequence, the number of multiplexing operations per unit time at the post-stage high-speed switch (SW) can be suppressed further.

A specific example of operation for multiplexing at the front-stage switch (SW2) and post-stage high-speed switch (SW) is described by referring to FIG. 13, which illustrates a case in which the outputs from bridge circuits connected with the MP data transfer path and host data transfer path are multiplexed at the front-stage switch (SW2) and then the output from the front-stage switch (SW2) and the output from the bridge circuit connected with the remaining drive controller data transfer path are multiplexed at the post-stage high-speed switch (SW) and transferred to the inter-controller data transfer path.

In the bridge circuit (BRG MP), a data set, for example, of a minimum transfer length is written into the second buffer. Then, when a timeout occurs or the buffer has been written up to its capacity, other buffer data that can be multiplexed by the front-stage switch (SW2) with coupled data created by the second buffer is selected. In FIG. 13, the amounts of data written into the first and second buffers for other bridge circuits (BRG H and BRG D) are compared with buffer capacities. Alternatively, a decision is made as to which of the bridge circuits permits data transfer when a timeout occurs. In FIG. 13, the bridge circuit (BRG H) is selected as one having other buffer data multiplexed with the bridge circuit (BRG MP) at the front stage. Furthermore, the multiplexing control portion receives a request signal that is created by the bridge circuit and transferred, and sends acknowledgement signal. After receiving the acknowledgement signal, reading from the buffer in the bridge circuit is started. In addition, a selection signal is issued to the front-stage switch (SW2) to select bridge circuit outputs that are time shared and multiplexed.

In the above-described case, the data set within other buffer satisfying the condition is singular in number. Where data sets within other plural buffers satisfy the condition, a selection may be made, for example, according to the kind of buffer permitting data transfer. For example, by selecting the second buffer having a smaller buffer capacity and by performing multiplexing at the front-stage switch (SW2), transfer delay of the transferred data at the post-stage switch (SW) can be suppressed.

After performing multiplexing at the front-stage switch (SW2), the post-stage high-speed switch (SW) time shares and multiplexes the output data from the front-stage switch (SW2) and the output data from the remaining bridge circuit (BRG D in this example) and transfers the resulting data to the inter-controller data transfer path.

The embodiment of embodiment 3 is based on the assumption that a bridge circuit configuration utilizes a combination of embodiment 1 for creating coupled data and embodiment 2 utilizing first and second buffers. The invention is not limited to this example. Even with a combination with only embodiment 1 or 2, the number of multiplexing operations on the high-speed switch (SW) can be suppressed. Advantages similar to the advantages of embodiment 3 can be obtained.

(4) Embodiment 4

FIG. 14 shows another example of architecture of the data storage apparatus of the present invention. The architecture of FIG. 14 has controllers 1a and 1b in the same way as the architecture of FIG. 1. In addition, the architecture of FIG. 14 has controllers 1c and 1d. The controllers are interconnected by cross data transfer paths that are dedicated data transfer paths. A multi-controller architecture is constituted. Host interfaces (Host I/F2, Host I/F3) (2c, 2d), drive interfaces (Drv I/F2, Drv I/F3) (3c, 3d), and cache memories (Cache 2, Cache 3) (4c, 4d) connected with the added controllers 1c and 1d are equivalent to their counterparts of FIG. 1. Therefore, their description is omitted. Each of microprocessors (MP0, MP1) (5a, 5b) is connected with two controllers and controls them.

Figure 15:
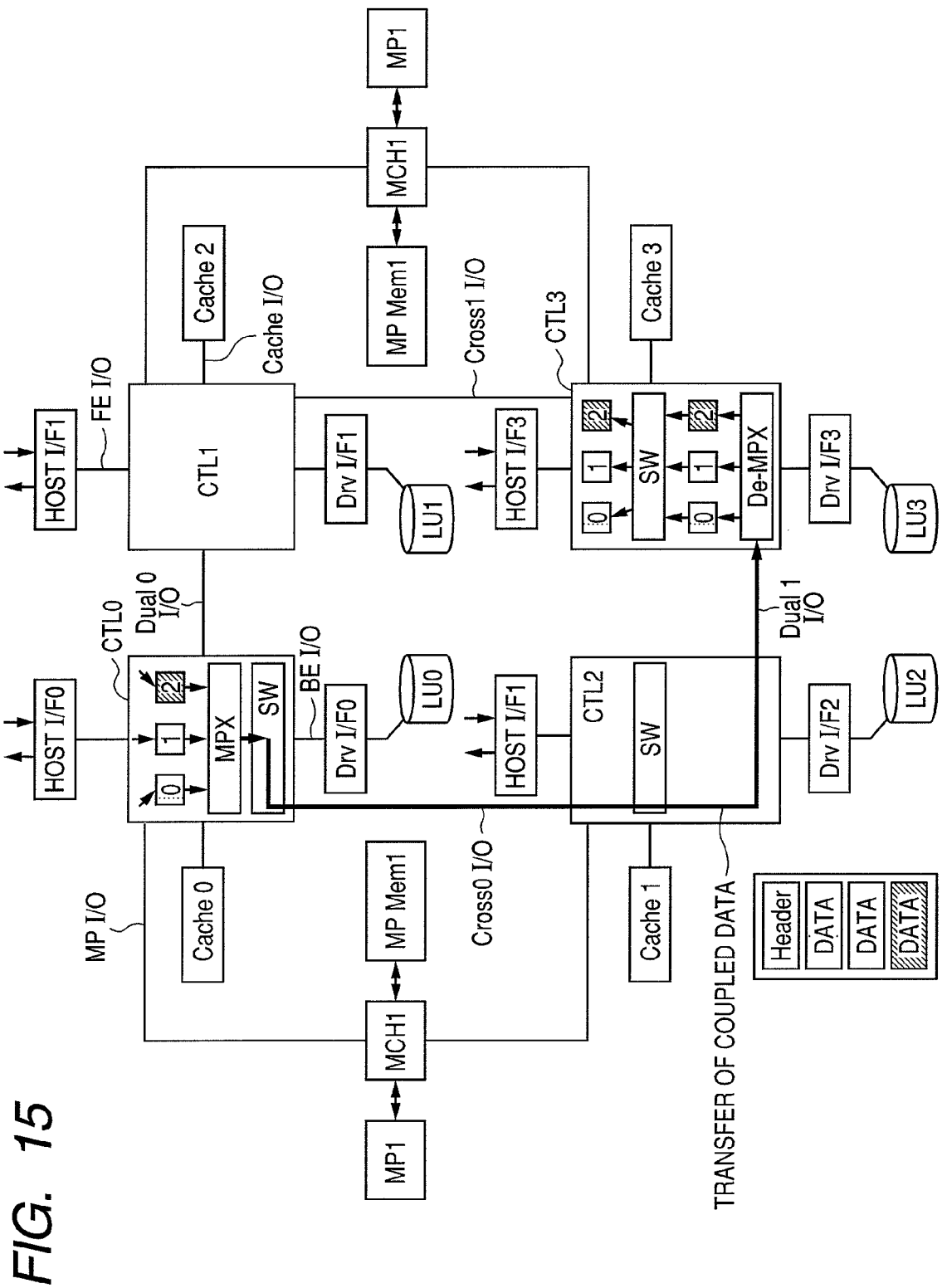
FIG. 15 is a diagram illustrating data transfer paths in the second data storage apparatus.

Data transfers performed by the multi-controller architecture data storage apparatus 100 are next described by referring to FIG. 15. The storage apparatus performs processing for dual writing data transferred from a host into two cache memories, processing for transferring data between a cache memory and a drive interface, processing for transferring data from a cache memory to a host interface, and processing for MP accesses between microprocessors and controllers similarly to the apparatus of FIG. 4. Their description is omitted.

FIG. 15 shows a case where data is transferred via plural controllers. This is an example of transfer unique to the multi-controller architecture. As an example, a case in which data is routed from controller 0 (CTL0) to controller 3 (CTL3) via controller 2 (CTL2) is shown. In the controller 0, transferred data sets (e.g., data sets 0-2) from data transfer paths are directly combined into a single data set and a new header is attached to form a coupled data set. This single data set is transferred to the controller 2 via the high-speed switch (SW) and Cross 0 data transfer path. In the controller 2, the coupled data set is not separated into the original data sets. Rather, the coupled data set is allowed to pass through the high-speed switch and transferred to the dual 1 data transfer path (Dual 1 I/O) without being altered. In the controller 3, the coupled data transferred via the dual 1 data transfer path (Dual 1 I/O) is separated into the original data sets 0 and 2 by a demultiplexer (De-MPX) and transferred to the transfer destination via the high-speed switch (SW). In this example, data sets transmitted through the inter-controller data transfer paths (Cross, Dual), controller 0 at the transfer source, and intermediary controller 2 are passed through the high-speed switch while the coupled data set is maintained. Consequently, increases in multiplicity and overhead can be suppressed.

The configuration within each controller is similar to the configuration of FIG. 2 except that a multiplexer (MPX) for creating coupled data and the demultiplexer (De-MPX) for demultiplexing the coupled data are added. The demultiplexer (De-MPX) is mounted between the input of Cross/Dual I/O and the high-speed switch (SW) in the output I/O. The multiplexer (MPX) will be described by referring to FIG. 17.

The header configuration of the coupled data described in connection with FIG. 15 is described. FIG. 16 shows a TLP format applied only to data transfers within each controller (1a, 1b, 1c, or 1d) and between the controllers forming the data storage apparatus 100 of FIG. 14. The shown format is adapted for coupled data and has been optimized for data transfer between plural controllers. The command format is similar to the format shown in FIG. 3 except that a flag for identification of the coupled data and information about the number of coupled data sets are added. Additionally, MPX is added as information for identification of the target source to the completer ID and requester ID. Because the coupled data are restored to the original data sets via the demultiplexer (De-MPX) before passing through the switch, the identification information about the transfer destination is identified only with the identification flag in the coupled data. It is not necessary to identify the transfer destination from the coupled data. The header is similar in other respects to the header shown in FIG. 3 and its description is omitted.

Creation of coupled data is not limited to transfers involving data, write command of (a) of FIG. 16, and read response of (d) of FIG. 16. The creation is also applied to write response of (b) of FIG. 16 and read command of (c) of FIG. 16.

Figure 17:
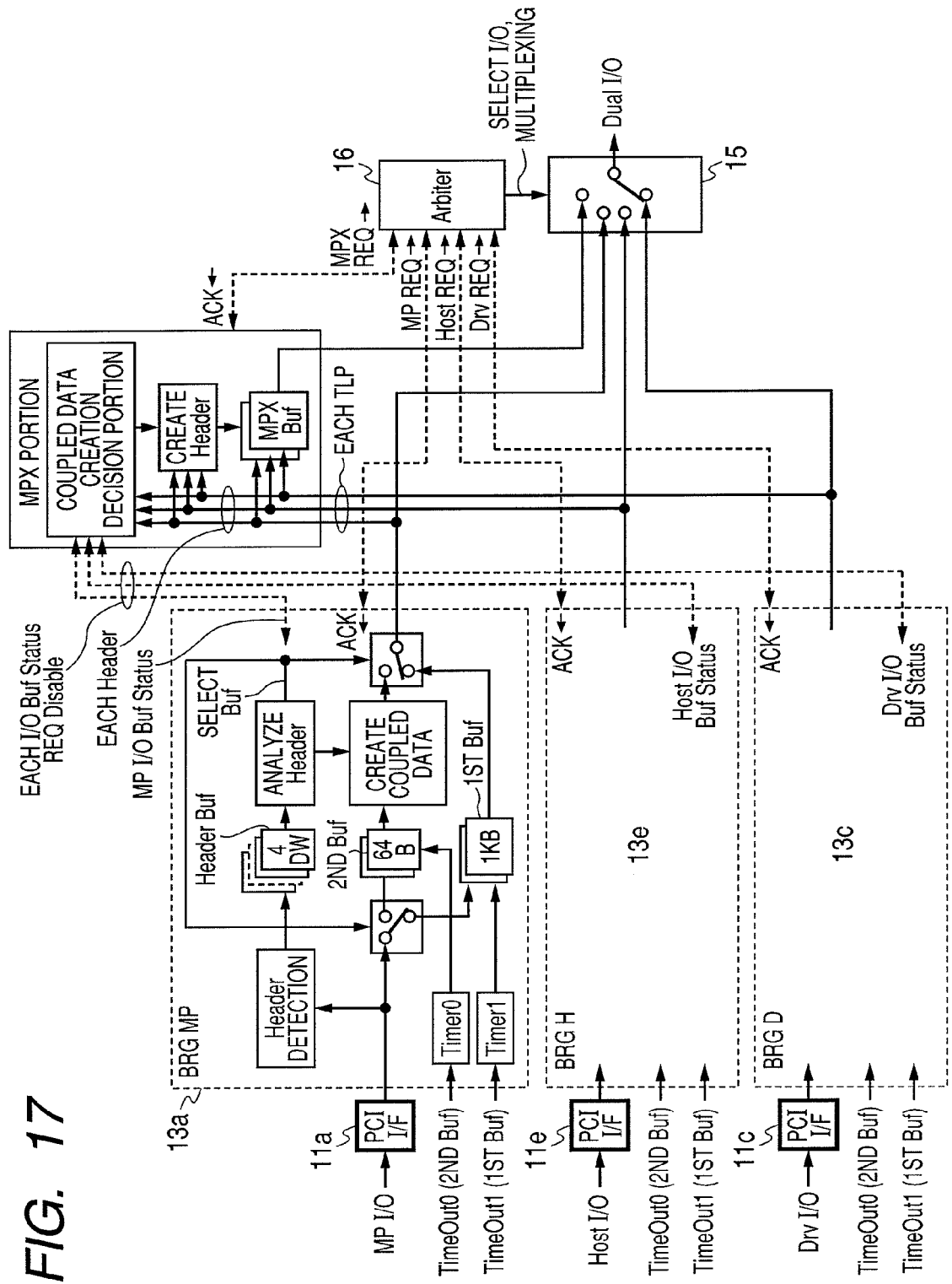
FIG. 17 is a diagram illustrating constituent components associated with data transfer to and from data transfer paths inside a controller constituting the second data storage apparatus.

An example of configuration of a controller having a multiplexer (MPX) is next described by referring to FIG. 17, which shows an example of configuration in which variable-length packets transferred from transfer paths (MP I/O, HOST I/O, and Drv I/O) for processor, host, and drive control are time shared and multiplexed at the high-speed switch (SW) 15 and transferred to the dual transfer path (Dual), in the same way as in FIG. 8. Bridge circuits (BRG MP 13a, BRG H 13e, and BRG D 13c) for processing the variable-length packets, high-speed switch (SW) 15, and arbiter 16 are similar to their counterparts of FIG. 8 and so their description is omitted. In the configuration of FIG. 17, the multiplexer (MPX) for controlling creation of coupled data is added. The multiplexer (MPX) is composed of a decision portion for making a decision on creation of coupled data from buffer status signals indicating status of buffer and occurrence of a timeout signal from each bridge circuit, a header generation portion for generating a header attached to the coupled data, and a multiplex buffer for storing data transferred from each bridge circuit and constituting coupled data by addition of the header. The multiplexer (MPX) outputs a dedicated request signal to the arbiter 16, and is connected with the high-speed switch (SW) via a dedicated data transfer path. The multiplexer outputs coupled data to the dual data transfer path (Dual) via the high-speed switch (SW).

The coupled data creation decision portion selects data sets to be coupled (i.e., selection of outputs from the bridge circuits) if the transfer destinations are the same controller. As in the example of transfer of FIG. 15, coupled data is intact passed through plural controllers and, therefore, transfer overhead produced at the high-speed switch of the relay controller is suppressed. Each bridge circuit inhibits a request signal for the first and second buffers in which data transferred to the multiplex buffer of the multiplexer is held, frees up the buffers, and continues writing of the received data into the buffers.

The header creation portion included in the multiplexer (MPX) creates header information including the identification flag for the coupled data and information about the number of coupled data sets. The controller number and MPX number of the transfer source are given as requester ID of the coupled data. The controller number of the transfer destination (BRG Dual in FIG. 17) is given as the completer ID.

Processing performed in the multiplexer (MPX) of FIG. 17 to create the coupled data is described by referring to the flowchart of FIG. 18.

When the buffer (first or second buffer) in the bridge circuit in a controller is filled to its capacity or when a given time has passed since start of data buffering and a timeout occurs, transfer from the buffer is ready (S81). The coupled data creation decision portion of the multiplexer (MPX) receives buffer status signals indicating how much each buffer is filled and as to whether a timeout has occurred from the bridge circuits within the same controller and manages all of the bridge circuits. The coupled data creation decision portion acquires buffer status signals from the other bridge circuits within the same controller in response to completion of preparations of transfer from a buffer (S82). Data sets to be stored in the buffer are selected (S83). The used decision method is the same as in step S23 of FIG. 12 and so its description is omitted.

If the decision at step S83 is negative, the bridge circuit creates a request signal, reads out data from the buffer, and outputs the data to the dual data transfer path (Dual) via the high-speed switch (SW) (S8b).

If the decision at step S83 is affirmative (Yes), program control proceeds to step S84, where only headers are acquired from bridge circuits satisfying the conditions of steps S81 and S83 (S84). The coupled data creation decision portion makes a decision from the acquired header information as to whether the transfer destination controllers regarding the coupled data sets are coincident (S85). In particular, the decision portion makes a decision as to whether the controller numbers constituting the headers of FIG. 3 are coincident.

If the decision at step S85 is negative, the processing starting with step S8b is performed.

If the decision at step S85 is affirmative (Yes), header information is created based on the header information already acquired by giving a requester ID consisting of the function number indicating the multiplexer (MPX) and the transfer source controller number and a completer ID consisting of the transfer destination controller number. The header information is written into the multiplex buffer (S86).

On the other hand, data sets for which the decision conditions of steps S81 and steps S83 to S85 hold are written into the multiplex buffer from the bridge circuits, thus constituting coupled data (S87). After the end of creation of the coupled data, the bridge circuits inhibit request signals to buffers in which the data sets for which the decision conditions of steps S81 and steps S83 to S85 hold and which are to be transferred to the multiplex buffer are held. The buffers are freed up, and writing of received data is continued. On the other hand, the multiplexer (MPX) requires the arbiter to create a request signal and transfer the coupled data (S88). The arbiter creates an acknowledgement signal in response to the request signal. The multiplexer reads the coupled data from the coupling buffer. Then, the arbiter time shares and multiplexes the coupled data with data from other bridge circuit on the high-speed switch (SW) and transfers the resulting signal to the inter-controller data transfer path (S89).

As can be understood from the description provided so far, when data is transferred from a bridge circuit, a buffer for creating coupled data is selected according to buffer statuses of the other bridge circuits. Data sets having transfer destinations that are the same controller are combined into one coupled data set. Consequently, increases in number of multiplexing operations per unit time, i.e., generation of the overhead, on the high-speed switch in the transfer source and also in the intermediary controller can be suppressed. Hence, the data storage apparatus of the multi-controller configuration can transfer packets efficiently.

The buffer specified in step S81 may be restricted to the second buffer. Coupled data may be created also by combination with data received by other bridge circuit. In addition, the buffer for which the decision is made in step S83 may be restricted to the second buffer. In this case, data sets having small transfer lengths are transferred as a coupled data set. Consequently, increases in number of multiplexing operations per unit time at the high-speed switch (SW) in the transfer source and also in the intermediary controller can be suppressed further. It is conceivable that the third embodiment is applied to the fourth embodiment. The front-stage switch (SW2) selects data sets to be coupled. The coupled data is passed through the post-stage high-speed switch (SW). In consequence, the same advantages as the third embodiment can be obtained.

What is claimed is:

1. A data storage apparatus comprising:
   a plurality of controllers connected with a host device and a plurality of storage devices via interfaces and connected with each other by first data transfer paths, which transfers data between said plurality of controllers, each of the plurality of controllers coupling a cache memory, respectively;
   a plurality of processors, each of which controlling a controller of said plurality of controllers, respectively; and each of the plurality of processors respectively controlling second data transfer paths via which a controller of the plurality of controllers transfer data to and from the host device, the plurality of storage devices, the cache memory and a processor of the plurality of processors;
   wherein each of said plurality of controllers has at least one data-processing portion for transferring data to the first and second data transfer paths, the data-processing portion of each of the plurality of controllers transferring data sent from a processor corresponding to a controller having the data-processing portion;
   wherein the plurality of controllers have dual data transfer paths to each other by said first and second data transfer paths;
   wherein said plurality of processors provide said storage devices as a plurality of logical units to said host device, and share control data between each other,
   wherein said plurality of processors share control data between each other and the shared control data are transferred via said first data transfer paths,
   wherein said data-processing portion has a header detection portion for detecting first header information constituting data, a selection portion for selecting from a plurality of data sets from which a coupled data set is to be created, a header creation portion for creating second header information about the coupled data set, coupled data creation portion for creating the coupled data set from the selected data sets and from the second header information, a first buffer for starting data transfer when a first buffer capacity is reached or a first timeout value is reached, a second buffer for starting data transfer when a second buffer capacity is reached or a second timeout value is reached, and a data storage portion for storing data sets having transfer lengths greater than a second threshold value into the first buffer and storing data sets having transfer lengths smaller than the second threshold value into the second buffer;
   wherein said selection portion selects from said plurality of data sets which have continuous addresses of transfer destination and which use the same data transfer path; and
   wherein said plurality of data sets are data sets stored in the second buffer.

2. A data storage apparatus as set forth in claim 1, further comprising:
   a plurality of the cache memories,
   wherein said selection portion selects from said plurality of data sets which have continuous addresses of transfer destination, use the same data transfer path, and have transfer lengths smaller than a first threshold value,
   wherein in response to a write command from said host device, write data is written to said plurality of cache memories via said first and second data transfer paths, and said data written to said plurality of cache memories is written to said plurality of storage devices respectively.

3. A data storage apparatus as set forth in claim 2, wherein said coupled data creation portion creates said coupled data set based on an order in which the selected data sets were received.

4. A data storage apparatus as set forth in claim 3, wherein said header creation portion takes address information about first position data of the coupled data set included in the selected data sets as address information about said second header information and takes a total of transfer lengths of the selected data sets as a transfer length of the second header information.

5. A data storage apparatus as set forth in claim 1, wherein said first buffer is greater than said second buffer in capacity.

6. A data storage apparatus as set forth in claim 1, wherein said first timeout value is greater than said second timeout value.

7. A data storage apparatus comprising:
   a plurality of controllers connected with a host device and a plurality of storage devices via interfaces and connected with each other by first data transfer paths, which transfers data between said plurality of controllers, each of the plurality of controllers coupling a cache memory, respectively;
   a plurality of processors, each of which controlling a controller of said plurality of controllers, respectively; and each of the plurality of processors respectively controlling second data transfer paths via which a controller of the plurality of controllers transfer data to and from the host device, the plurality of storage devices, the cache memory and a processor of the plurality of processors;

wherein each of said plurality of controllers has a plurality of data-processing portions for transferring data to the first and second data transfer paths, the plurality of data-processing portions of each of the plurality of controllers transferring data sent from a processor corresponding to a controller having the plurality of data-processing portions;

wherein the plurality of controllers have dual data transfer paths to each other by said first and second data transfer paths;

wherein said plurality of processors provide said storage devices as a plurality of logical units to said host device, and share control data between each other, wherein said plurality of processors share control data between each other and the shared control data are transferred via said first data transfer paths, wherein each of the plurality of data-processing portions has a header detection portion for detecting first header information constituting data, a selection portion for selecting from a plurality of data sets from which a coupled data set is to be created, a header creation portion for creating second header information about the coupled data set, and coupled data creation portion for creating the coupled data set from the selected data sets and from the second header information;

wherein said selection portion selects from said plurality of data sets which have continuous addresses of transfer destination and which use the same data transfer path;

wherein there are further provided a front-stage switch connected with the plurality of data-processing portions and a post-stage switch connecting the front-stage switch and the plurality of data-processing portions; and wherein there is further provided a multiplexing control portion for multiplexing first data sets transferred from the plurality of data-processing portions at the front-stage switch to create first multiplexed data and for creating second multiplexed data at the post-stage switch from second data transferred from the plurality of data-processing portions and from said first multiplexed data.

8. A data storage apparatus as set forth in claim 7, wherein said multiplexing control portion creates a first multiplexing request signal based on a request signal of the first data to the front-stage switch, and wherein the first multiplexing request signal is used as a request signal of the first multiplexed data to the post-stage switch.

9. A method of data transfer for a data storage apparatus, wherein said data storage apparatus includes plurality of controllers each of which receiving I/O from a host device and controlling data to be transferred to a cache memory and storage devices via interfaces, respectively, and plurality of processors, each of which controlling a controller of the plurality of controllers respectively, each of the plurality of controllers having at least one data-processing portion, the method comprising:

detecting a first header information constituting data by said data-processing portion;

selecting data sets from plurality of data sets such that a coupled data set is created from the selected data sets by said data processing portion;

creating a second header information about the coupled data set by said data processing portion;

creating the coupled data set from the selected data sets and from the second header information by said data processing portion;

transferring said coupled data set to first data transfer paths or second data transfer paths by said data processing portion; and when data sets from which the coupled data set is created are selected from said plurality of data sets, selecting those data sets which have continuous addresses of transfer destination and which use the same data transfer path by the data-processing portion, wherein said plurality of controllers connected with each other by first and second data transfer paths, wherein the plurality of controllers transfer data to and from the host device, the plurality of storage devices, and the plurality of processors via said second data transfer paths, wherein said plurality of processors provides said storage devices as a plurality of logical units to said host device, and share control data between each other, wherein said plurality of processors share control data between each other and the shared control data are transferred via said first data transfer paths, wherein the data processing portion of each of the plurality of controllers transfers data sent from a processor corresponding to a controller having the data-processing portion, wherein said data-processing portion has: a first buffer for starting data transfer when a first buffer capacity is reached or a first timeout value is reached; and a second buffer for starting data transfer when a second buffer capacity is reached or a second timeout value is reached, wherein data sets having transfer lengths greater than a second threshold value are stored into the first buffer, wherein data sets having transfer lengths smaller than the second threshold value are stored into the second buffer, and wherein said plurality of data sets are data sets stored in the second buffer.

10. A method of data transfer as set forth in claim 9, wherein when data sets from which said coupled data set is created are selected from said plurality of data sets, which have continuous addresses of transfer destination, use the same data transfer path, and have transfer lengths smaller than a first threshold value are selected from said plurality of data sets, wherein in response to a write command from said host device, write data is written to a plurality of cache memories via said first and second data transfer paths, and said data written to said plurality of cache memories is written to said plurality of storage devices respectively.

11. A method of data transfer as set forth in claim 10, wherein when said coupled data set is created from said selected data sets and from said second header information, said coupled data set is created based on an order in which the selected data sets were received.

12. A method of data transfer as set forth in claim 11, wherein when said second header information about said coupled data is created, address information about first position data of the coupled data set included in the selected data sets is taken as address information included in said second header information and a total of transfer lengths of the selected data sets is taken as a transfer length of the second header information.

13. A method of data transfer as set forth in claim 9, wherein said first buffer capacity is greater than said second buffer capacity.

14. A method of data transfer as set forth in claim 9, wherein said first timeout value is greater than said second timeout value.

15. A method of data transfer for a data storage apparatus, wherein said data storage apparatus includes plurality of controllers each of which receiving I/O from a host device and controlling data to be transferred to a cache memory and storage devices via interfaces, respectively, and plurality of processors, each of which controlling a controller of the plurality of controllers respectively, each of the plurality of controllers having a plurality of data-processing portions, the method comprising:

detecting a first header information constituting data by each of the plurality of data-processing portions;

selecting data sets from plurality of data sets such that a coupled data set is created from the selected data sets by each of the plurality of data-processing portions;

creating a second header information about the coupled data set by each of the plurality of data-processing portions;

creating the coupled data set from the selected data sets and from the second header information by each of the plurality of data-processing portions;

transferring said coupled data set to first data transfer paths or second data transfer paths by each of the plurality of data-processing portions; and when data sets from which the coupled data set is created are selected from said plurality of data sets, selecting those data sets which have continuous addresses of transfer destination and which use the same data transfer path by each of the plurality of data-processing portions;

wherein said plurality of controllers connected with each other by first and second data transfer paths;

wherein the plurality of controllers transfer data to and from the host device, the plurality of storage devices, and the plurality of processors via said second data transfer paths;

wherein said plurality of processors provides said storage devices as a plurality of logical units to said host device, and share control data between each other;

wherein said plurality of processors share control data between each other and the shared control data are transferred via said first data transfer paths;

wherein the plurality of data-processing portions of each of the plurality of controllers transfer data sent from a processor corresponding to a controller having the plurality of data-processing portions;

wherein there are further provided a front-stage switch connected with the plurality of data-processing portions and a post-stage switch interconnecting the front-stage switch and the plurality of data-processing portions;

wherein first data sets transferred from the plurality of data-processing portions are multiplexed at the front-stage switch to create first multiplexed data; and wherein second multiplexed data is created at the post-stage switch from second data transferred from the plurality of data-processing portions and from said first multiplexed data.

16. A method of data transfer as set forth in claim 15, wherein a first multiplexing request signal is created based on a request signal of said first data to the front-stage switch, and wherein said first multiplexing request signal is sent to the post-stage switch as a request signal of the first multiplexed data to the post-stage switch.

* * * * *